US009208205B2

(12) United States Patent
Saito et al.

(10) Patent No.: US 9,208,205 B2
(45) Date of Patent: Dec. 8, 2015

(54) INFORMATION PROCESSING DEVICE AND PROGRAM

(71) Applicant: Sony Corporation, Tokyo (JP)

(72) Inventors: Mari Saito, Kanagawa (JP); Kei Tateno, Tokyo (JP); Ryo Mukaiyama, Tokyo (JP); Yoshiyuki Kobayashi, Tokyo (JP); Hideyuki Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 254 days.

(21) Appl. No.: 13/829,269

(22) Filed: Mar. 14, 2013

(65) Prior Publication Data

US 2013/0262458 A1 Oct. 3, 2013

(30) Foreign Application Priority Data

Mar. 30, 2012 (JP) ................................ 2012-079033

(51) Int. Cl.
*G06F 17/30* (2006.01)
*G11B 27/031* (2006.01)

(52) U.S. Cl.
CPC .... *G06F 17/30554* (2013.01); *G06F 17/30772* (2013.01); *G11B 27/031* (2013.01); *G06F 17/30766* (2013.01)

(58) Field of Classification Search
CPC .................... G06F 17/30554; G06F 17/30772; G11B 27/031
USPC ........................................ 707/731, 748, 749
See application file for complete search history.

(56) References Cited

U.S. PATENT DOCUMENTS

2003/0221541 A1* 12/2003 Platt ................................ 84/609
2004/0068552 A1* 4/2004 Kotz et al. ...................... 709/218
2007/0061497 A1* 3/2007 Takatsuka ...................... 711/100
2007/0074617 A1* 4/2007 Vergo .............................. 84/612
2008/0141133 A1* 6/2008 Yamamoto et al. ........... 715/716
2009/0063414 A1* 3/2009 White et al. ...................... 707/3
2009/0083326 A1* 3/2009 Pelton ......................... 707/104.1
2010/0088327 A1* 4/2010 Holm et al. ................... 707/758
2010/0131548 A1* 5/2010 Moon et al. ................... 707/769
2011/0246508 A1* 10/2011 Maekawa et al. ............. 707/769
2013/0166649 A1* 6/2013 Atzmon et al. ............... 709/204
2013/0198632 A1* 8/2013 Hyman ......................... 715/716

FOREIGN PATENT DOCUMENTS

JP 2011-221133 11/2011

* cited by examiner

*Primary Examiner* — Rehana Perveen
*Assistant Examiner* — Tiffany Thuy Bui
(74) *Attorney, Agent, or Firm* — Frommer Lawrence & Haug LLP; William S. Frommer; Ellen Marcie Emas

(57) ABSTRACT

There is provided an information processing device including a theme setting unit that sets a theme to generate an item list including one or more items, an item list editing unit that adds an item designated for the theme by at least a user irrelevant to a setting of the theme to the item list in which the theme is set, and an output control unit that controls an output of the item list.

14 Claims, 21 Drawing Sheets

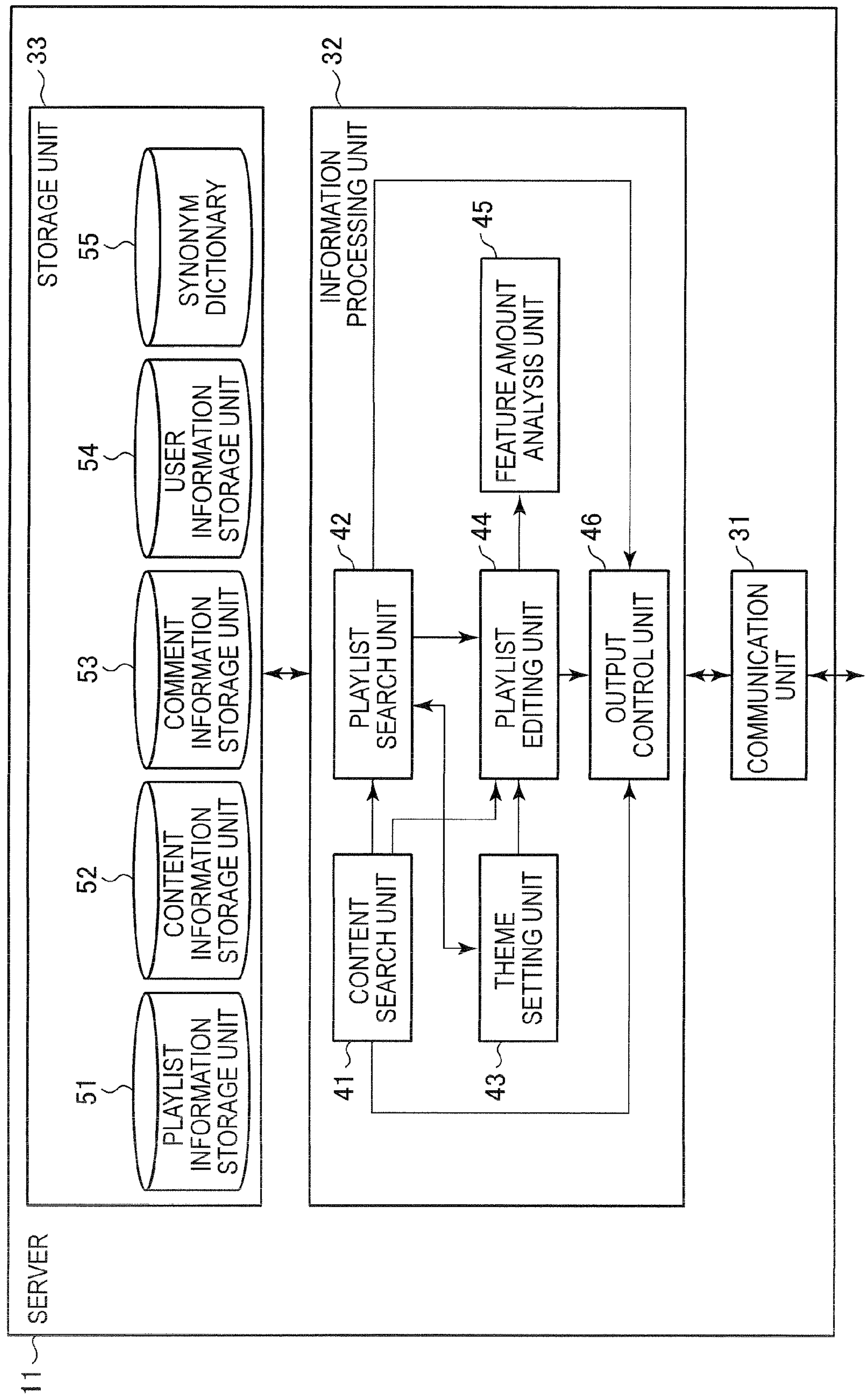
FIG. 2
SERVER
11
STORAGE UNIT
33
PLAYLIST INFORMATION STORAGE UNIT
51
CONTENT INFORMATION STORAGE UNIT
52
COMMENT INFORMATION STORAGE UNIT
53
USER INFORMATION STORAGE UNIT
54
SYNONYM DICTIONARY
55
INFORMATION PROCESSING UNIT
32
CONTENT SEARCH UNIT
41
PLAYLIST SEARCH UNIT
42
THEME SETTING UNIT
43
PLAYLIST EDITING UNIT
44
FEATURE AMOUNT ANALYSIS UNIT
45
OUTPUT CONTROL UNIT
46
COMMUNICATION UNIT
31

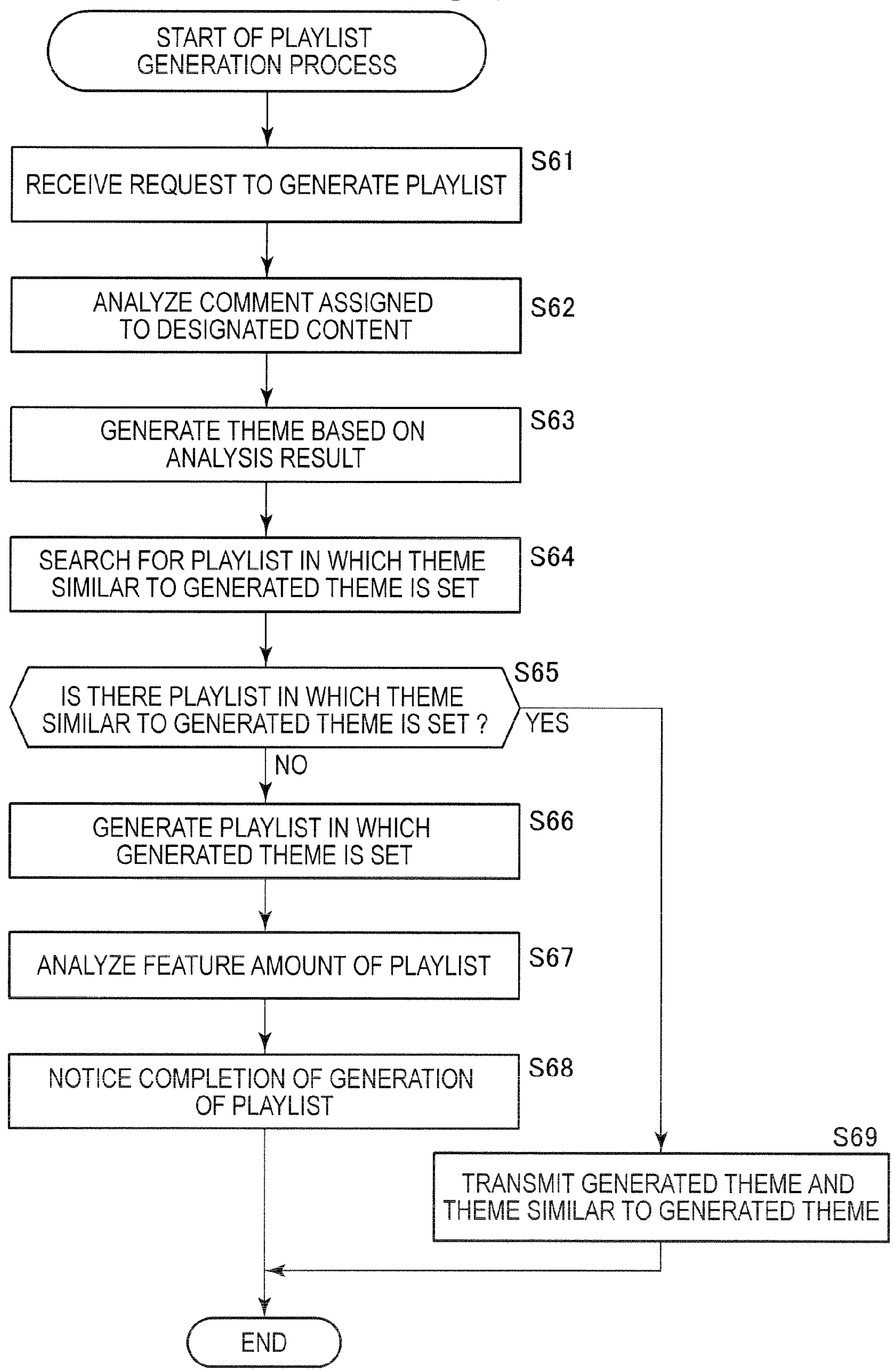
FIG. 7
START OF PLAYLIST GENERATION PROCESS
RECEIVE REQUEST TO GENERATE PLAYLIST
S61
ANALYZE COMMENT ASSIGNED TO DESIGNATED CONTENT
S62
GENERATE THEME BASED ON ANALYSIS RESULT
S63
SEARCH FOR PLAYLIST IN WHICH THEME SIMILAR TO GENERATED THEME IS SET
S64
IS THERE PLAYLIST IN WHICH THEME SIMILAR TO GENERATED THEME IS SET ?
S65
YES
NO
GENERATE PLAYLIST IN WHICH GENERATED THEME IS SET
S66
ANALYZE FEATURE AMOUNT OF PLAYLIST
S67
NOTICE COMPLETION OF GENERATION OF PLAYLIST
S68
TRANSMIT GENERATED THEME AND THEME SIMILAR TO GENERATED THEME
S69
END PLAYLIST SEARCH
MORNING,
SEARCH
RISING HOUR
Morning
...
101
103
102
111
SEARCH RESULT
122
GENERATION OF NEW THEME
121a
MORNING
121b
Morning
121c
MUSIC FOR FEELING GOOD WHEN YOU WAKE UP
121d
Fresh Song
121e
MUSIC FOR SUNNY DAY 1. ARTIST A
Cool!!
2. ARTIST B
Beautiful voice
3. ARTIST C
IF YOU LISTEN TO IT ONCE YOU'LL NEVER FORGET IT
131
21
89
15
64
151a
155
151b
151c
152a
152b
152c
153a
154a
153b
154b
153c
161
172
SEARCH RESULT
GENERATION OF NEW THEME
MORNING
Morning
MUSIC FOR FEELING GOOD WHEN YOU WAKE UP
Fresh Song
MUSIC FOR SUNNY DAY
171a
171b
171c
171d
171e

INFORMATION PROCESSING DEVICE AND PROGRAM

BACKGROUND

The present technology relates to an information processing device and a program, and more particularly, to an information processing device and a program suitable to use a service that can generate or present an item list According to the related art, services delivering pieces of content such as musical compositions provide a function of generating a playlist in which pieces of content which users themselves like are collected or causing a plurality of users to share the generated playlist. Further, the users simply collects the pieces of content which they like using this function, and the users also determine, for example, a specific theme such as music helpful for health and generate a playlist in which the pieces of content suitable for the theme are collected in many cases.

Further, a technology for designating parameters which represent the characteristics of musical compositions by users and extracting the musical compositions suitable for designated parameters so that a playlist is automatically generated has been presented (for example, see JP 2011-221133A).

SUMMARY

However, since the knowledge of the pieces of content of individuals is limited, it is difficult to collect a certain amount of the pieces of content suitable for a theme and generate a playlist of the pieces of content, and thus it takes considerable time to perform this task.

Further, since a subjective view of an individual is considerably reflected in the playlist generated by the individual, the playlist may not be appropriate to the preferences or emotions of other users. Accordingly, it is considerably difficult to search for a playlist appropriate to the preferences or emotions of users themselves among shared playlists.

Furthermore, it is difficult to quantify human preferences or emotions. Therefore, even when playlists are automatically generated based on the designated parameters, the playlists desired by the users themselves may not be necessarily generated. On the other hand, it takes considerable times to automatically generate the playlists desired by the users themselves, since many kinds of parameters have to be appropriately set.

It is desirable to provide the present technology for providing a list of items suitable for a preference or an emotion of a user in a service that provides various kinds of item lists including pieces of content.

According to a first embodiment of the present disclosure, there is provided an information processing device including a theme setting unit that sets a theme to generate an item list including one or more items, an item list editing unit that adds an item designated for the theme by at least a user irrelevant to a setting of the theme to the item list in which the theme is set, and an output control unit that controls an output of the item list.

The information processing device may further include an item list search unit that searches for the item list based on the item designated by the user. The output control unit may further control an output of a search result of the item list.

The information processing device may further include a feature amount analysis unit that calculates a feature amount of the item list based on a feature amount of an item included in the item list. The item list search unit may search for the item list with a feature amount similar to a feature amount of the item designated by the user.

The feature amount analysis unit may calculate the feature amount of the item list by weighting, based on evaluation assigned to the item included in the item list by the user, the feature amount of the item.

The information processing device may further include an item search unit that searches for similar items with a feature amount similar to the feature amount of the item designated by the user. The item list search unit may search for the item list including the item designated by the user and all or some of the similar items.

The information processing device may further include an item list search unit that searches for the item list in which a theme similar to a character string designated by the user is set. The output control unit may control output of a search result of the item list.

The information processing device may further include an item search unit that searches for a candidate for an item to be added to the item list. The output control unit may control output of a search result of the candidate for the item.

The item search unit may search for an item with at least one of a feature amount, metadata, and an assigned comment similar to a feature amount, metadata, and an assigned comment of an item in the item list, respectively, as the candidate for the item to be added to the item list.

The item list editing unit may add the candidate for the item searched for by the item search unit to the item list.

The theme setting unit may set a theme designated by the user.

The theme setting unit may set the theme based on a comment assigned to the item designated by the user.

The information processing device may further include a feature amount analysis unit that calculates a feature amount of the item list based on a feature amount of an item included in the item list. The item list editing unit may integrate a plurality of the item lists with similar feature amounts.

The item list editing unit may assign, to an item added to a playlist, metadata based on a theme set in the playlist.

According to the first embodiment of the present disclosure, there is provided a program for causing a computer to perform the processes of setting a theme to generate an item list including one or more items, adding an item designated for the theme by at least a user irrelevant to a setting of the theme to the item list in which the theme is set, and controlling an output of the item list.

According to a second embodiment of the present disclosure, there is provided an information processing device including a communication unit that receives an item list to which an item is able to be added for a set theme by at least a user irrelevant to a setting of the set theme from another information processing device, and transmits information indicating the item to be added to the item list to the other information processing device, a display control unit that controls display of the received item list, and an input unit that is used to designate the item to be added to the item list.

The information processing device may further include a history management unit that manages an item use history of the user, and a selection unit that selects candidates for the item to be added to the item list, which are to be presented to the user. The communication unit may receive information indicating the candidates for the item to be added to the item list from the other information processing device. The selection unit may select the candidates for the item to be presented to the user among the received candidates for the item based on the item use history of the user.

The selection unit may further select the candidates for the item to be presented to the user among the received candidates for the item based on at least one of position information regarding the information processing device, a type of the information processing device, and time information.

According to a second embodiment of the present disclosure, there is provided a recording medium having a program recorded thereon, the program causing a computer to perform the processes of receiving an item list to which an item is able to be added for a set theme by at least a user irrelevant to a setting of the theme from another information processing device, controlling display of the received item list, and transmitting information indicating an item designated as the item to be added to the item list to the other information processing device.

According to the first embodiment of the present technology, the theme is set to generate the item list of one or more items, and the item designated for the theme by at least the user irrelevant to the setting of the theme is added to the item list in which the theme is set, and the output of the item list is controlled.

According to the second embodiment of the present technology, the item list to which the item is able to be added for the set theme by at least the user irrelevant to a setting of the theme is received from another information processing device, display of the received item list is controlled, and the information indicating an item designated as the item to be added to the item list is transmitted to the other information processing device.

According to first and second embodiments of the present technology, it is possible to provide a list of items suitable for a preference or emotion of a user.

BRIEF DESCRIPTION OF THE DRAWINGS

FIG. 2 is a block diagram illustrating an exemplary configuration of a server;

FIG. 7 is a flowchart illustrating a playlist generation process;

DETAILED DESCRIPTION OF THE EMBODIMENTS

Figure 1:
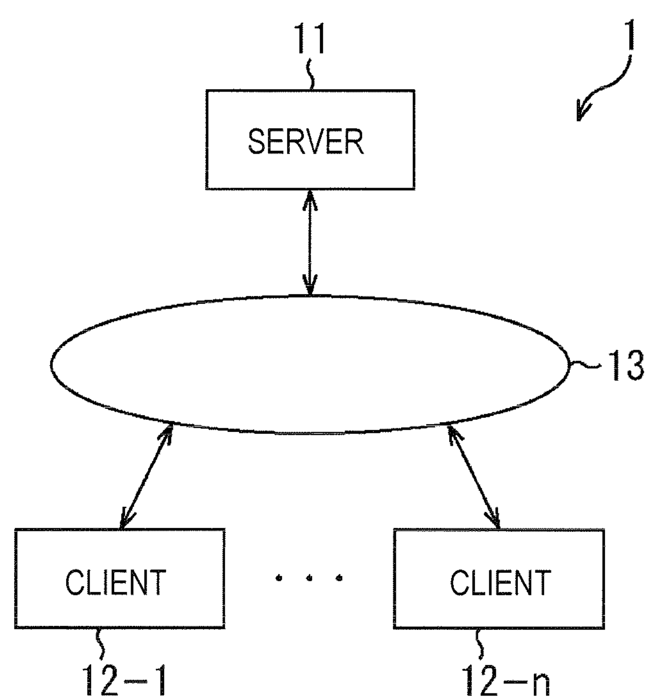
FIG. 1 is a block diagram illustrating an information processing system according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as embodiments) for carrying out the present technology will be described. The description will be made in the following order.

1. Embodiment
2. Modification Examples

<1. Embodiment>

[Exemplary Configuration of Information Processing System 1]

FIG. 1 is a block diagram illustrating an information processing system according to an embodiment of the present technology.

An information processing system 1 is configured to include a server 11 and clients 12-1 to 12-n. The server 11 and the clients 12-1 to 12-n are connected to each other via a network 13.

Hereinafter, when it is not necessary to distinguish the clients 12-1 to 12-n from each other, the clients 12-1 to 12-n are merely referred to as the clients 12.

The server 11 provides a service of delivering content such as a moving image or music which is one of various kinds of items to each client 12. The server 11 provides a function of assisting each user individually to generate a list (playlist) of one or more pieces of content and sharing the generated playlist. The server 11 provides a function of enabling users themselves or the server 11 itself to set any theme and enabling the respective users to cooperatively generate a playlist for the set theme.

For example, the client 12 includes a device capable of using pieces of content of personal computers, portable information terminals, cellular phones, smart phones, moving image players, audio players, or the like.

[Exemplary Configuration of Server 11]

FIG. 2 is a block diagram illustrating an exemplary configuration of the server 11.

The server 11 is configured to include a communication unit 31, an information processing unit 32, and a storage unit 33. The information processing unit 32 is configured to include a content search unit 41, a playlist search unit 42, a theme setting unit 43, a playlist editing unit 44, a feature amount analysis unit 45, and an output control unit 46. The storage unit 33 is configured to include a playlist information storage unit 51, a content information storage unit 52, a comment information storage unit 53, a user information storage unit 54, and a synonym dictionary 55. The communication unit 31 and each unit of the information processing unit 32 can access each other. All units of the information processing unit 32 and all units of the storage unit 33 can access each other.

The communication unit 31 communicates with each client 12 via the network 13 to transmit and receive various kinds of information, instructions, and the like relevant to a content delivery service.

The content search unit 41 searches for content matching a designated condition based on information stored in the content information storage unit 52. For example, the content search unit 41 searches for content similar to content designated by the client 12. For example, the content search unit 41 searches recommendation candidates which are candidates for the content to be added to a playlist being edited by the client 12. Then, the content search unit 41 supplies the search result to the playlist search unit 42, the theme setting unit 43, the playlist editing unit 44, or the output control unit 46, as necessary.

The playlist search unit 42 searches for a playlist matching the designated condition based on information stored in the playlist information storage unit 51, the content information storage unit 52, and the comment information storage unit 53. For example, the content search unit 41 searches for a playlist in which a theme similar to a theme or character string designated by the client 12 is set. For example, the content search unit 41 searches for a playlist with a feature amount similar to that of the content designated by the client 12. For example, the content search unit 41 searches for a playlist including content designated by the client 12 or all or some of pieces of content similar to the content designated by the client 12. Then, the playlist search unit 42 supplies the search result to the theme setting unit 43, the playlist editing unit 44, or the output control unit 46, as necessary.

The theme setting unit 43 sets a theme of the playlist. For example, the theme setting unit 43 sets a theme based on designation from the client 12. For example, the theme setting unit 43 generates the theme based on a comment assigned to the content designated by the client 12. Then, the theme setting unit 43 supplies the generated theme to the playlist search unit 42 and acquires the search result of the playlist in which a theme similar to the generated theme is set from the playlist search unit 42. The theme setting unit 43 requests the playlist editing unit 44 to generate the playlist in which the set theme is set.

The playlist editing unit 44 variously edits the playlist. For example, the playlist editing unit 44 generates the playlist based on the request from the theme setting unit 43 and stores information regarding the generated playlist in the playlist information storage unit 51. For example, the playlist editing unit 44 edits the playlist stored in the playlist information storage unit 51 based on a request from the client 12 and stores information regarding the playlist after the edit in the playlist information storage unit 51. For example, the playlist editing unit 44 performs addition and deletion of the content to and from the playlist irrespective of a request from the client 12 and integrates the playlists. Then, the playlist editing unit 44 notifies the feature amount analysis unit 45 and the output control unit 46 that the playlist has been edited.

The playlist editing unit 44 assigns metadata which is based on the theme set in the added playlist to the content added to the playlist and stores the assigned metadata in the content information storage unit 52.

The feature amount analysis unit 45 calculates a feature amount of each playlist based on the feature amount of the content included in each playlist based on the information stored in the playlist information storage unit 51 and the content information storage unit 52. The feature amount analysis unit 45 stores the calculated feature amount of each playlist in the playlist information storage unit 51.

The output control unit 46 controls transmission of the information regarding the playlist, the search result of the playlist, the information indicating the candidates for the content to be added to the playlist, and the like to the client 12 via the communication unit 31.

The playlist information storage unit 51 stores information regarding each playlist. For example, the playlist information storage unit 51 stores a theme of each playlist, identification information (for example, a user ID) regarding the user (when the users generate the playlist cooperatively) setting the theme or the users (when the users individually generate the playlists) generating the playlists, a feature amount of each playlist, and the like. For example, the playlist information storage unit stores identification information (for example, a content ID) regarding content in the playlist, a content order of each playlist, evaluation of each user for each content of each playlist, and the like.

The content information storage unit 52 stores information regarding each content used in the content delivery service. For example, the content information storage unit 52 stores identification information (for example, a content ID) of each content, a feature amount, metadata indicating various kinds of attributes, evaluation of each user for the content, a use state of each content, and the like.

The evaluation of the user for the content stored in the playlist information storage unit 51 and the evaluation of the user for the content stored in the content information storage unit 52 are slightly different from each other in meaning. That is, the latter refers to evaluation for the single content, whereas the former refers to evaluation indicating whether the content is suitable for the playlist in addition to the evaluation of the single content. Further, when it is necessary to distinguish both the evaluations from each other, the former is referred to as composite evaluation and the latter is referred to as single evaluation.

The comment information storage unit 53 stores information regarding a comment assigned to each content. For example, the comment information storage unit 53 stores identification information (for example, a comment ID) regarding each comment, identification information (for example, a content ID) regarding the content to which the comment is assigned, identification information (for example, a user ID) regarding the user who assigned the comment, a language used in the comment, a date on which the comment was assigned, the details of the comment, and the like.

The user information storage unit 54 stores information regarding each user using the content delivery service. For example, the user information storage unit 54 stores identification information (for example, a user ID) regarding each user, an attribute of each user, a behavior history (for example, a service use history or a content use history) of each user, and the like.

The synonym dictionary 55 includes a synonym dictionary of each language used in a region in which the content delivery service is provided.

[Exemplary Configuration of Client 12]

Figure 3:
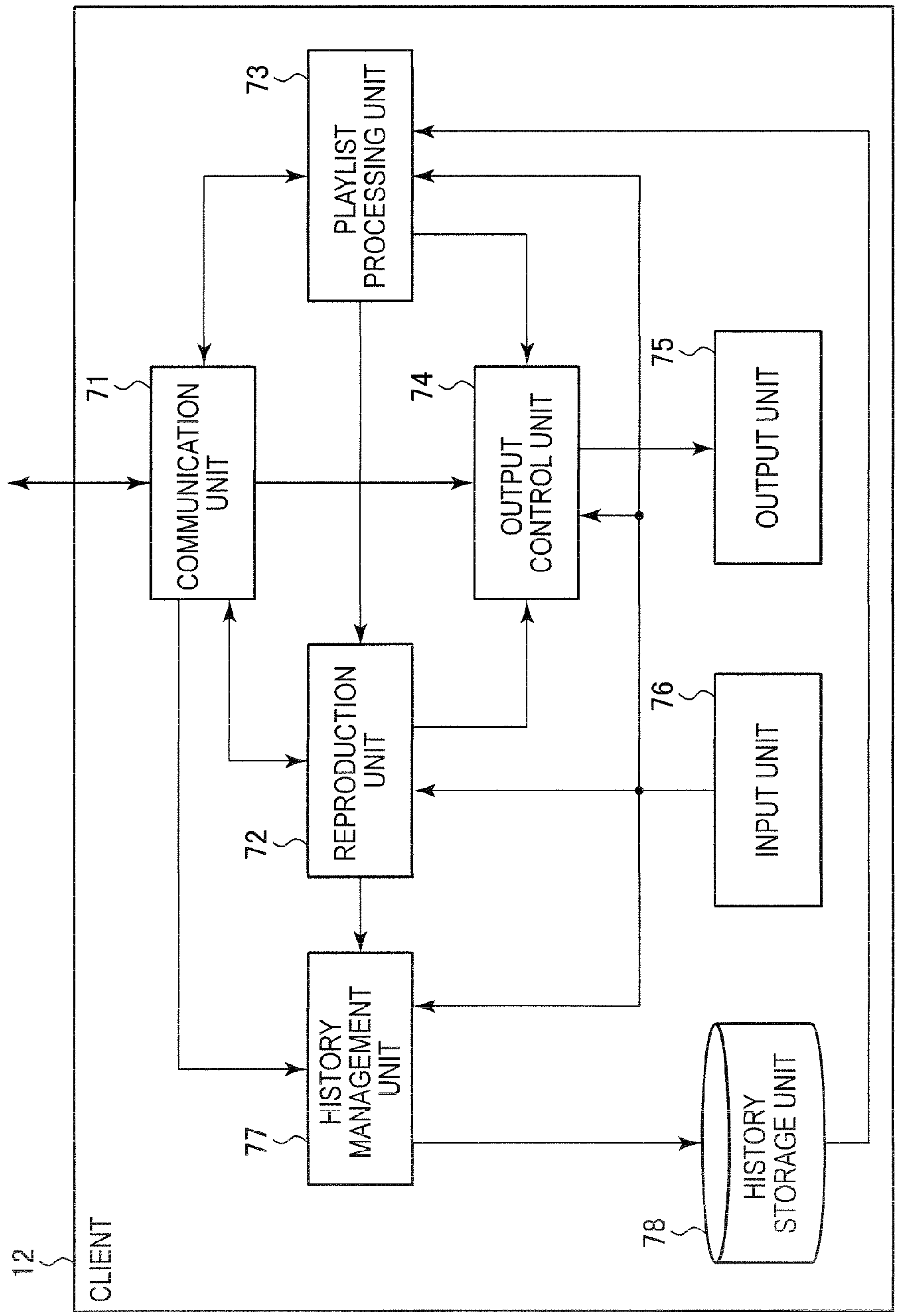
FIG. 3 is a block diagram illustrating an exemplary configuration of a client.

FIG. 3 is a block diagram illustrating an exemplary functional configuration of the client 12.

The client 12 is configured to include a communication unit 71, a reproduction unit 72, a playlist processing unit 73, an output control unit 74, an output unit 75, an input unit 76, a history management unit 77, and a history storage unit 78.

The communication unit 71 communicates with each server 11 via the network 13 to transmit and receive various kinds of information or instructions relevant to the content delivery service.

The reproduction unit 72 receives content from the server 11 via the network 13 and the communication unit 71 and reproduces the received content. The reproduction unit 72 supplies reproduction data obtained as the result of the reproduction to the output control unit 74. The reproduction unit 72 supplies a content reproduction history to the history management unit 77.

The playlist processing unit 73 performs a process relevant to the playlist in the client 12 based on an instruction or the like input using the input unit 76 by the user. For example, the playlist processing unit 73 requests the server 11 to set a new theme, generate, search for, and edit a playlist, and the like via the communication unit 71. For example, the playlist processing unit 73 requests the server 11 to transmit the playlist via the communication unit 71 and receives information regarding the requested playlist from the server 11. For example, the playlist processing unit 73 controls the output control unit 74 such that the output control unit 74 causes the output unit 75 to display a playlist presentation screen, a reproduction screen, an editing screen, a search screen, and the like of the playlist. For example, the playlist processing unit 73 edits the playlist in a local environment of the client 12. For example, the playlist processing unit 73 controls the reproduction of the playlist by the reproduction unit 72.

The output control unit 74 receives, from the server 11, information to be presented to the user, such as information regarding the content or a comment assigned to the content or information to be displayed together with the reproduction of the content via the network 13 and the communication unit 71. The output control unit 74 controls display of a moving image or a still image, an output of audio, and the like on the output unit 75 based on the reproduction data. The output control unit 74 controls display of various kinds of information received from the server 11 on the output unit 75.

For example, the output unit 75 is configured to include various kinds of display devices such as a display and various audio output devices such as a speaker or an audio output terminal.

For example, the input unit 76 includes various kinds of input devices such as a keyboard, a mouse, a touch panel, and a microphone. The input unit 76 supplies information, an instruction, or the like input by the user to the reproduction unit 72, the playlist processing unit 73, the output control unit 74, and the history management unit 77.

The history management unit 77 generates a content use history of the user based on the information received from the server 11 via the communication unit 71, the content reproduction history supplied from the reproduction unit 72, and an instruction of the user supplied from the input unit 76 and stores the generated content use history in the history storage unit 78. The content use history includes histories of browsing of the information regarding the content, purchase, reproduction, removal of the content, assignment of comments or evaluations, and the like.

[Processes of Information Processing System 1]

Next, processes of the information processing system 1 will be described with reference to FIGS. 4 to 21.

In each process, a user which is an actor using the service on the side of the client 12 is referred to as an active user below.

(Process when Active User Newly Generates Theme of Playlist)

First, a process when an active user newly generates a theme of a playlist will be described.

Figure 4:
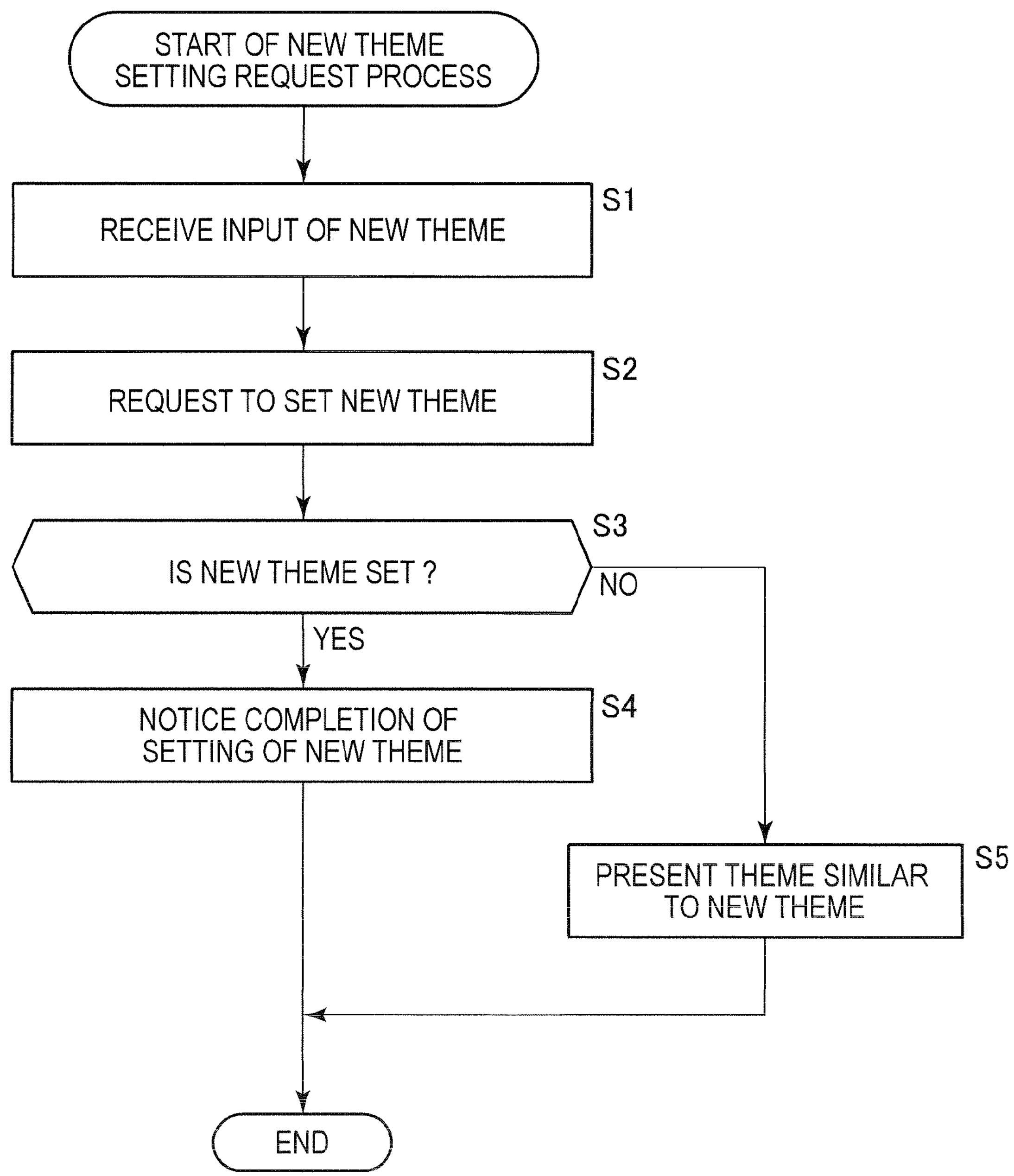
FIG. 4 is a flowchart illustrating a new theme setting request process.

A new theme setting request process performed by the client 2 will be first described with reference to the flowchart of FIG. 4.

This process starts, for example, when the active user inputs an instruction to newly generate a theme of a playlist using the input unit 76 of the client 12 and the instruction is supplied from the input unit 76 to the playlist processing unit 73.

In step S1, the client 12 receives an input of the new theme. Specifically, the output control unit 74 causes the output unit 75 to display a screen used to input the new theme of the playlist under the control of the playlist processing unit 73. The active user inputs the new theme using the input unit 76. The input unit 76 notifies the playlist processing unit 73 of the input new theme.

At this time, the details of the theme are not particularly limited. For example, a short phrase theme such as "morning" or "Fresh Song" or a more specific theme such as "music for feeling good when you wake up," "music for sunny day," or "music with impressive drum solos" can be input. Not only themes for emotive expressions described above but also a theme including a specific attribute of content such as an artist name, a date, a genre, or the like such as "representative music of artist A" or "50s jazz" can be set. Further, a language used to generate the theme is not particularly limited.

In step S2, the client 12 requests setting of a new theme. Specifically, when the active user confirms the input new theme using the input unit 76, the input unit 76 notifies the playlist processing unit 73 of the confirmation of the new theme. The playlist processing unit 73 generates a theme setting request signal which includes the input new theme and the identification information regarding the active user and is used to request setting of the new theme, and then transmits the theme setting request signal to the server 11 via the communication unit 71.

As will be described below with reference to FIG. 5, the server 11 receiving the theme setting request signal transmitted from the client 12 searches for the playlist in which a theme similar to the new theme is set. When there is no playlist in which a theme similar to the new theme is set, the server 11 generates a playlist in which a new theme is set and transmits a theme setting completion signal used to notice completion of the setting of the new theme to the client 12 of the active user. Conversely, when there is a playlist in which a theme similar to the new theme is set, the server 11 transmits a similar theme notification signal including the similar theme to the client 12 of the active user.

In step S3, the playlist processing unit 73 determines whether the new theme is set. When the playlist processing unit 73 receives the theme setting completion signal from the server 11 via the network 13 and the communication unit 71, the playlist processing unit 73 determines that the new theme is set. Then, the process proceeds to step S4.

In step S4, the client 12 notices the completion of the setting of the new theme. Specifically, the output control unit 74 outputs a screen, audio, or the like used to notice the completion of the setting of the new theme to the output unit 75 under the control of the playlist processing unit 73. Thus, the active user is notified of the setting of the new theme.

Thereafter, the new theme setting request process ends.

Conversely, when the playlist processing unit 73 receives the similar theme notification signal via the network 13 and the communication unit 71 in step S3, the playlist processing unit 73 determines that the new theme is not set. Then, the process proceeds to step S5.

In step S5, the output control unit 74 causes the output unit 75 to present the theme similar to the new theme under the control of the playlist processing unit 73. Thus, the active user can know that there is already a playlist in which the theme similar to the new theme generated by the active user himself or herself is set and the details of the theme. For example, the active user can participate in editing of the playlist in which the similar theme is set or can use the playlist. Alternatively, for example, the active user can change the new theme generated by the active user himself or herself so that the new theme is not similar to another theme.

Thereafter, the new theme setting request process ends.

Next, a new theme setting process performed by the server 11 in correspondence with the new theme setting request process performed in FIG. 4 by the client 12 will be described with reference to the flowchart of FIG. 5.

In step S21, the communication unit 31 receives a request to set the new theme. That is, the communication unit 31 receives the theme setting request signal from the client 12 via the network 13. The communication unit 31 supplies the theme setting request signal to the playlist search unit 42 and the theme setting unit 43.

In step S22, the playlist search unit 42 searches for the playlist in which a theme similar to the new theme is set. Specifically, the playlist search unit 42 analyzes the new theme and the theme of each playlist stored in the playlist information storage unit 51 in accordance with a predetermined method.

At this time, any analysis method can be adopted according to a necessary search level or the like. For example, a model such as bag-of-words (BOW) can be created by parsing each theme according to a word level, or a topic or a characteristic phrase of each theme can be extracted using the synonym dictionary 55, latent Dirichlet allocation (LDA), or the like.

For example, the playlist search unit 42 calculates similarity between the new theme and the theme of each playlist and extracts a theme with similarity equal to or greater than a predetermined threshold value as the theme similar to the new theme. Alternatively, for example, the playlist search unit 42 extracts a theme including a topic or a phrase which is the same as or similar to the topic or the characteristic phrase extracted from the new theme among the themes of the playlists as the theme similar to the new theme.

In step S23, the playlist search unit 42 determines whether there is the playlist in which the theme similar to the new theme is set based on the result of the process of step S22. When it is determined that there is no playlist in which the theme similar to the new theme is set, the process proceeds to step S24.

In step S24, the server 11 generates the playlist in which the new theme is set. Specifically, the playlist search unit 42 notifies the theme setting unit 43 that there is no playlist in which the theme similar to the new theme is set. The theme setting unit 43 requests the playlist editing unit 44 to generate the playlist in which the new theme is set. The playlist editing unit 44 generates the playlist in which the new theme is set and stores information regarding the generated playlist in the playlist information storage unit 51.

Thereafter, since the playlist in which the new theme generated by the active user is set is publicized, not only the active user but also other users irrelevant to the setting of the corresponding theme can participate in the edit of the playlist.

In step S25, the server 11 notifies the output control unit of the completion of the setting of the new theme. Specifically, the playlist editing unit 44 notifies the output control unit 46 of the generation of the playlist in which the new theme is set. The output control unit 46 generates the above-described theme setting completion signal and transmits the generated theme setting completion signal to the client 12 via the communication unit 31.

Thereafter, the new theme setting process ends.

Conversely, when it is determined in step S23 that there is the playlist in which the theme similar to the new theme is set, the process proceeds to step S26.

In step S26, the server 11 transmits the theme similar to the new theme. Specifically, the playlist search unit 42 notifies the output control unit 46 of the theme similar to the new theme and searched through the process of step S22. The output control unit 46 generates the similar theme notification signal including the theme similar to the new theme and transmits the generated similar theme notification signal to the client 12 via the communication unit 31.

Thereafter, the new theme setting process ends.

(Process when Playlist Including Designated Content is Newly Generated)

Next, a process when a playlist including content designated by the active user is newly generated will be described. In this process, a theme of the playlist is automatically generated based on the content designated by the active user.

Figure 6:
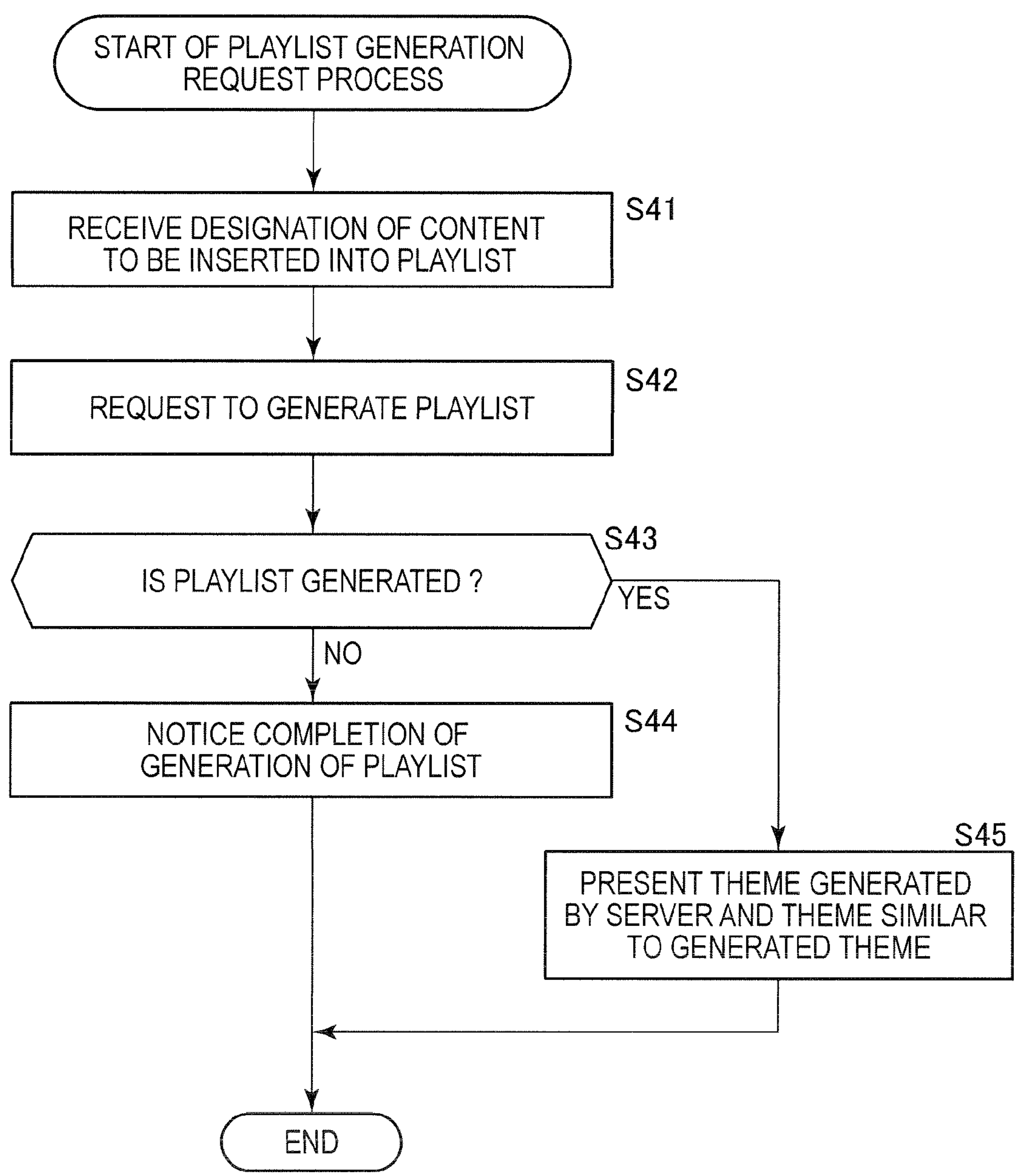
FIG. 6 is a flowchart illustrating a playlist generation request process.

A playlist generation request process performed by the client 12 will be first described with reference to the flowchart of FIG. 6.

This process starts, for example, when the active user inputs an instruction to generate the playlist using the input unit 76 of the client 12 and the instruction is supplied from the input unit 76 to the playlist processing unit 73.

In step S41, the client 12 receives a designation of content to be inserted into the playlist. Specifically, the output control unit 74 causes the output unit 75 to display a screen used to designate the content to be inserted into the playlist under the control of the playlist processing unit 73. The active user designates the title and the like of the content desired to enter a newly generated playlist using the input unit 76. At this time, the active user may be configured to designate a plurality of pieces of content. The input unit 76 supplies information regarding the designated content to the playlist processing unit 73.

In step S42, the client 12 requests to generate the playlist. Specifically, when the active user confirms content to be inserted into the playlist using the input unit 76, the input unit 76 notifies the playlist processing unit 73 of the confirmation of the content. The playlist processing unit 73 generates a playlist generation request signal which includes information (for example, identification information) indicating the designated content and identification information of the active user and is used to request to generate the playlist including the content, and transmits the generated playlist generation request signal to the server 11 via the communication unit 71.

As will be described below with reference to FIG. 7, the server 11 receiving the playlist generation request signal transmitted from the client 12 generates the theme of the playlist based on the designated content. The server 11 searches for the playlist in which the theme similar to the generated theme is set. Then, when there is no playlist in which the theme similar to the generated theme is set, the server 11 generates a playlist which includes the designated content and in which the generated theme is set. The server 11 transmits, to the client 12 of the active user, a playlist generation completion signal which includes the information indicating the generated theme and is used to notice the completion of the generation of the playlist.

Conversely, when there is the playlist in which the theme similar to the generated theme is set, the server 11 transmits a similar theme notification signal including the generated theme and a theme similar to the generated theme to the client 12 of the active user.

In step S43, the playlist processing unit 73 determines whether the playlist is generated. When the playlist processing unit 73 receives the playlist generation completion signal from the server 11 via the network 13 and the communication unit 71, the playlist processing unit 73 determines that the playlist is generated. Then, the process proceeds to step S44.

In step S44, the client 12 notices the completion of the generation of the playlist. Specifically, the output control unit 74 causes the output unit 75 to output a screen, audio, or the like used to notice the completion of the generation of the playlist under the control of the playlist processing unit 73. Thus, the active user is notified of the generation of the playlist including the designated content and the theme of the automatically generated playlist.

Thereafter, the playlist generation request process ends.

Conversely, when the playlist processing unit 73 receives the similar theme notification signal from the server 11 via the network 13 and the communication unit 71 in step S43, the playlist processing unit 73 determines that the playlist is not generated. Then, the process proceeds to step S45.

In step S45, the output control unit 74 causes the output unit 75 to present the theme generated by the server 11 and the theme similar to the generated theme under the control of the playlist processing unit 73. Thus, the active user can know that there is already the playlist in which the theme similar to the theme automatically generated by the server 11 based on the content designated by the active user himself or herself is set and the details of the similar theme. For example, the active user can participate in editing of the playlist in which the similar theme is set or can use the playlist.

Thereafter, the playlist generation request process ends.

Next, a playlist generation process performed by the server 11 in correspondence with the playlist generation request process performed in FIG. 6 by the client 12 will be described with reference to the flowchart of FIG. 7.

In step S61, the communication unit 31 receives a request to generate the playlist. That is, the communication unit 31 receives a playlist generation request signal from the client 12 via the network 13. The communication unit 31 supplies the playlist generation request signal to the theme setting unit 43 and the playlist editing unit 44.

In step S62, the theme setting unit 43 analyzes a comment assigned to the designated content. Specifically, the theme setting unit 43 reads the comment assigned by each active user to the content designated by the active user from the comment information storage unit 53. Then, the theme setting unit 43 parses each comment according to a word level using a predetermined method and performs analysis such as aggregation of appearance frequency of each word. At this time, any analysis method can be adopted depending on a purpose.

In step S63, the theme setting unit 43 generates a theme based on the analysis result. For example, the theme setting unit 43 generates the theme using characteristic phrases (for example, a word or a phrase with high appearance frequency) in the comment assigned to the designated content. The theme setting unit 43 notifies the playlist search unit 42 of the generated theme.

Figure 5:
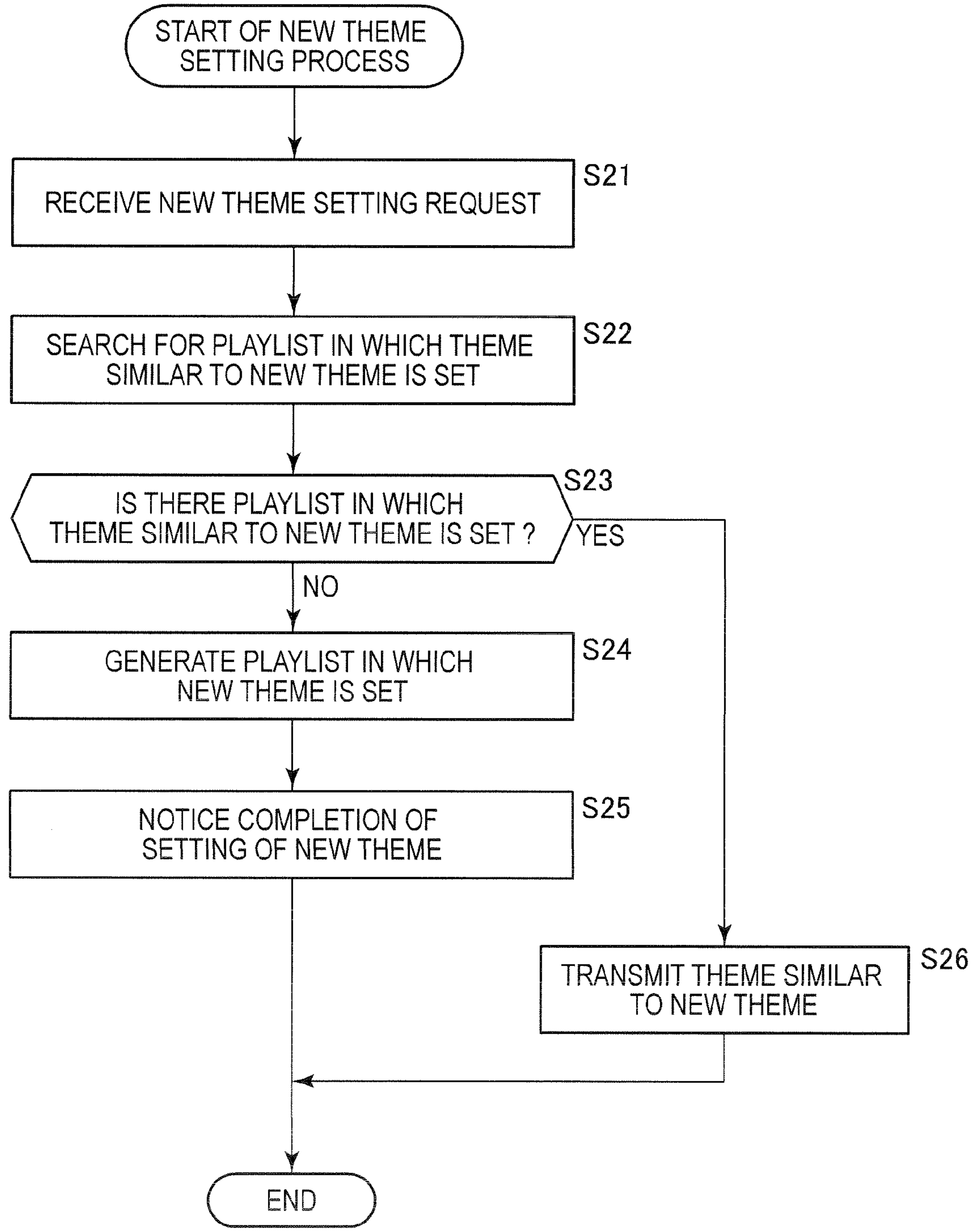
FIG. 5 is a flowchart illustrating a new theme setting process.

In step S64, the playlist in which a theme similar to the generated theme is set is searched for, as in the process of step S22 of FIG. 5.

In step S65, the playlist search unit 42 determines whether there is the playlist in which a theme similar to the generated theme is set based on the result of the process of step S64. When there is no the playlist in which a theme similar to the generated theme is set, the process proceeds to step S66.

In step S66, the server 11 generates the playlist in which the generated theme is set. Specifically, the playlist search unit 42 notifies the theme setting unit 43 that there is no playlist in which a theme similar to the generated theme is set. The theme setting unit 43 requests the playlist editing unit 44 to generate the playlist in which the generated theme is set. The playlist editing unit 44 generates the playlist in which the theme generated by the theme setting unit 43 is set and which includes the content designated by the active user, and stores information regarding the generated playlist in the playlist information storage unit 51.

Thereafter, since the playlist in which the theme generated by the theme setting unit 43 is set is publicized, not only the active user but also other users irrelevant to the setting of the theme can participate in the edit of the playlist.

In step S67, the server 11 analyzes the feature amount of the playlist. Specifically, the playlist editing unit 44 notifies the feature amount analysis unit 45 that the playlist is newly generated. The feature amount analysis unit 45 reads the feature amount of the content included in the newly generated playlist from the content information storage unit 52. Then, based on the feature amount of each content included in the playlist, the feature amount analysis unit 45 obtains the feature amount of the playlist. For example, the feature amount analysis unit 45 calculates an average value of the feature amounts of the pieces of content included in the playlist as the feature amount of the playlist.

In step S68, the server 11 notifies the output control unit 46 of the completion of the generation of the playlist. Specifically, the playlist editing unit 44 notifies the output control unit 46 of the completion of the generation of the playlist. The output control unit 46 generates the above-described playlist generation completion signal and transmits the generated playlist generation completion signal to the client 12 via the communication unit 31.

Thereafter, the playlist generation process ends.

Conversely, when it is determined in step S64 that there is the playlist in which the theme similar to the generated theme is set, the process proceeds to step S69.

in step S69, the server 11 transmits the generated theme and the theme similar to the generated theme. Specifically, the playlist search unit 42 notifies the output control unit 46 of the result of the search process of step S65. The output control unit 46 generates a similar theme notification signal including the theme generated by the theme setting unit 43 and the theme similar to the generated theme and transmits the generated similar theme notification signal to the client 12 via the communication unit 31.

Thereafter, the playlist generation process ends.

(First Playlist Search Process)

Next, a playlist search process performed by the information processing system 1 according to a first embodiment will be described with reference to the flowchart of FIG. 8. In this embodiment, a playlist in which a theme similar to a character string (hereinafter referred to as a search character string) input by the active user is set is searched for.

This process starts, for example, when the active user inputs an instruction to search for the playlist using the input unit 76 of the client 12 and the instruction is supplied from the input unit 76 to the playlist processing unit 73.

In step S101, the client 12 receives an input of the search character string. Specifically, the output control unit 74 causes the output unit 75 to display a screen used to input the search character string under the control of the playlist processing unit 73.

Figure 9:
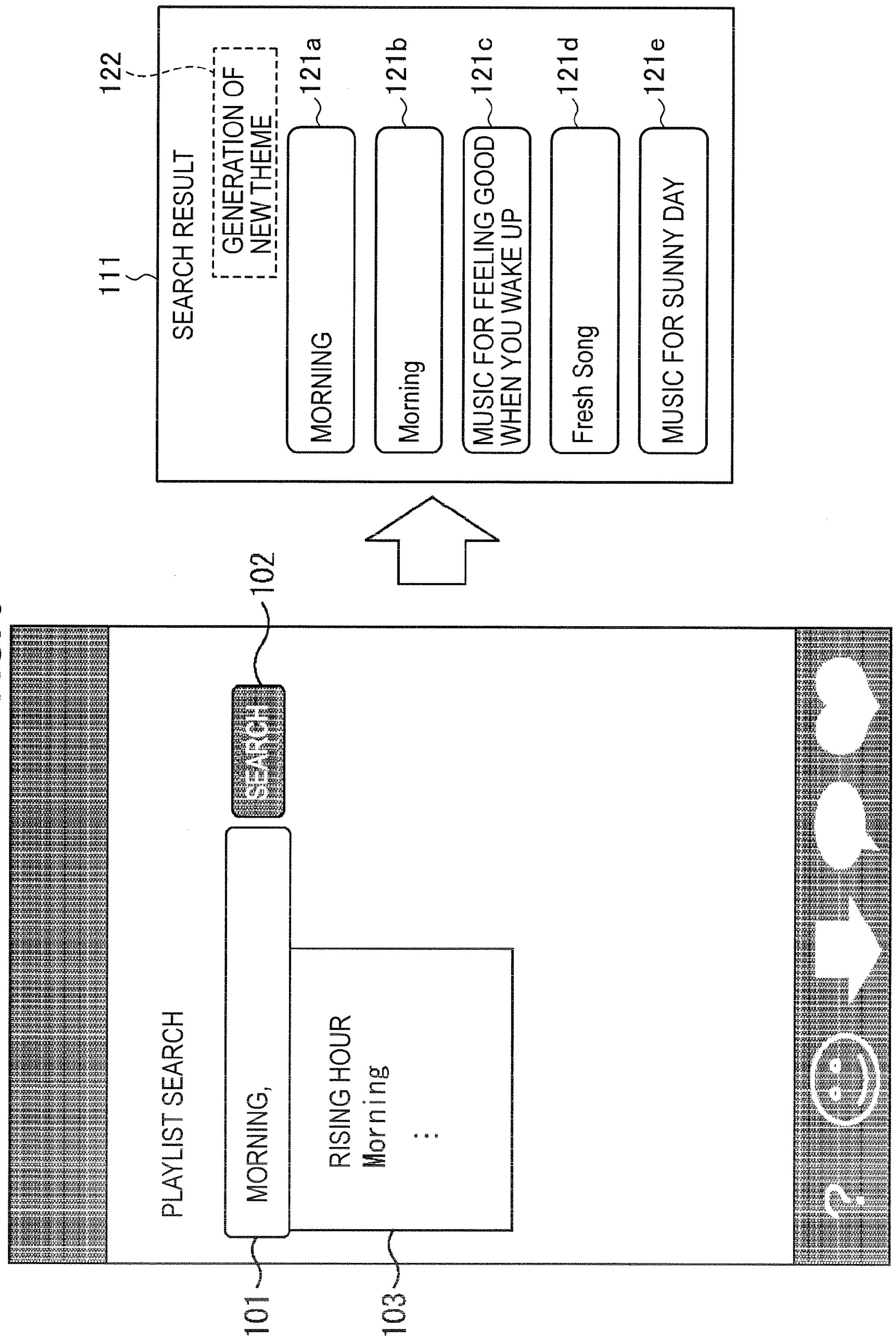
FIG. 9 is a diagram illustrating a first example of a playlist search screen.

A screen on the left side of FIG. 9 is an example of a playlist search screen displayed at this time. On the playlist search screen, an input box 101, a search button 102, and a list box 103 are displayed.

The active user inputs the search character string into the input box 101 using the input unit 76. At this time, whenever the search characteristic string in the input box 101 is changed, the input unit 76 supplies the search character string to the playlist processing unit 73, and the playlist processing unit 73 transmits the search character string to the server 11 via the communication unit 71. Then, the playlist processing unit 73 receives a phrase relevant to the search character string from the server 11 via the network 13 and the communication unit 71 displays the received phrase within the list box 103 by controlling the output control unit 74. Thus, the active user can input the desired search character string more quickly.

In step S102, the client 12 requests a search for the playlist. Specifically, when the active user presses down the search button 102 on the playlist search screen of FIG. 9 using the input unit 76, the input unit 76 notifies the playlist processing unit 73 that the search button 102 is pressed down. The playlist processing unit 73 generates a playlist search request which includes the input search character string and is used to request a search for the playlist in which a theme similar to the search character string is set, and transmits the generated playlist search request signal to the server 11 via the communication unit 71.

In step S103, the server 11 receives the request to search for the playlist. That is, the communication unit 31 of the server 11 receives the playlist search request signal from the client 12 via the network 13. The communication unit 31 supplies the received playlist search request signal to the playlist search unit 42.

In step S104, the playlist search unit searches for the playlist in which the theme similar to the search character string is set through the same process as the process of step S22 of FIG. 5. Thus, the playlist search unit searches for the playlist in which the theme with similarity to the search character string and equal to or greater than a predetermined threshold value or the theme including a topic or a phrase which is the same as or similar to the search character string is set.

In step S105, the server 11 transmits the search result. Specifically, the playlist search unit 42 supplies the search result to the output control unit 46. The output control unit 46 generates a search result notification signal which is searched for through the process of step S104 and includes the theme similar to the search character string and transmits the search result notification signal to the client 12 via the communication unit 31.

In step S106, the client 12 receives the search result. That is, the communication unit 71 of the client 12 receives the search result notification signal via the network 13. The communication unit 71 supplies the search result notification signal to the playlist processing unit 73.

In step S107, the output control unit 74 causes the output unit 75 to present the search result under the control of the playlist processing unit 73. Thus, for example, a window 111 on the right side is displayed within the playlist search screen on the left side of FIG. 9.

The window 111 is configured to display the search result of the playlist. Selection buttons 121*a* to 121*e* and a generation button 122 are displayed.

In the selection buttons 121*a* to 121*e*, themes of the playlists similar to the search character string searched in the server 11 are displayed. When the active user selects any one of the selection buttons 121*a* to 121*e* using the input unit 76, information regarding the playlist in which the selected theme is set is displayed.

On the other hand, when the active user desires to newly generate a theme due to the fact that the desired theme is not included in the search result, the active user presses down the generation button 122 using the input unit 76. Thereafter, the active user can newly set the theme generated by the active user himself or herself through the above-described processes, referring to FIGS. 4 and 5.

Thereafter, the playlist search process ends.

Thus, the active user can search for the playlist in which the theme similar to the search character string is set by merely inputting the search character string.

(Second Playlist Search Process)

Next, a playlist search process performed by the information processing system 1 according to a second embodiment will be described with reference to the flowchart of FIG. 10. In this embodiment, a playlist including content designated by the active user and a similar content is searched for.

This process starts, for example, when the active user inputs an instruction to search for the playlist using the input unit 76 of the client 12 and the instruction is supplied from the input unit 76 to the playlist processing unit 73.

In step S121, the client 12 receives designation of content used for the search. Specifically, the output control unit 74 causes the output unit 75 to display a screen used to designate the content under the control of the playlist processing unit 73.

Figure 11:
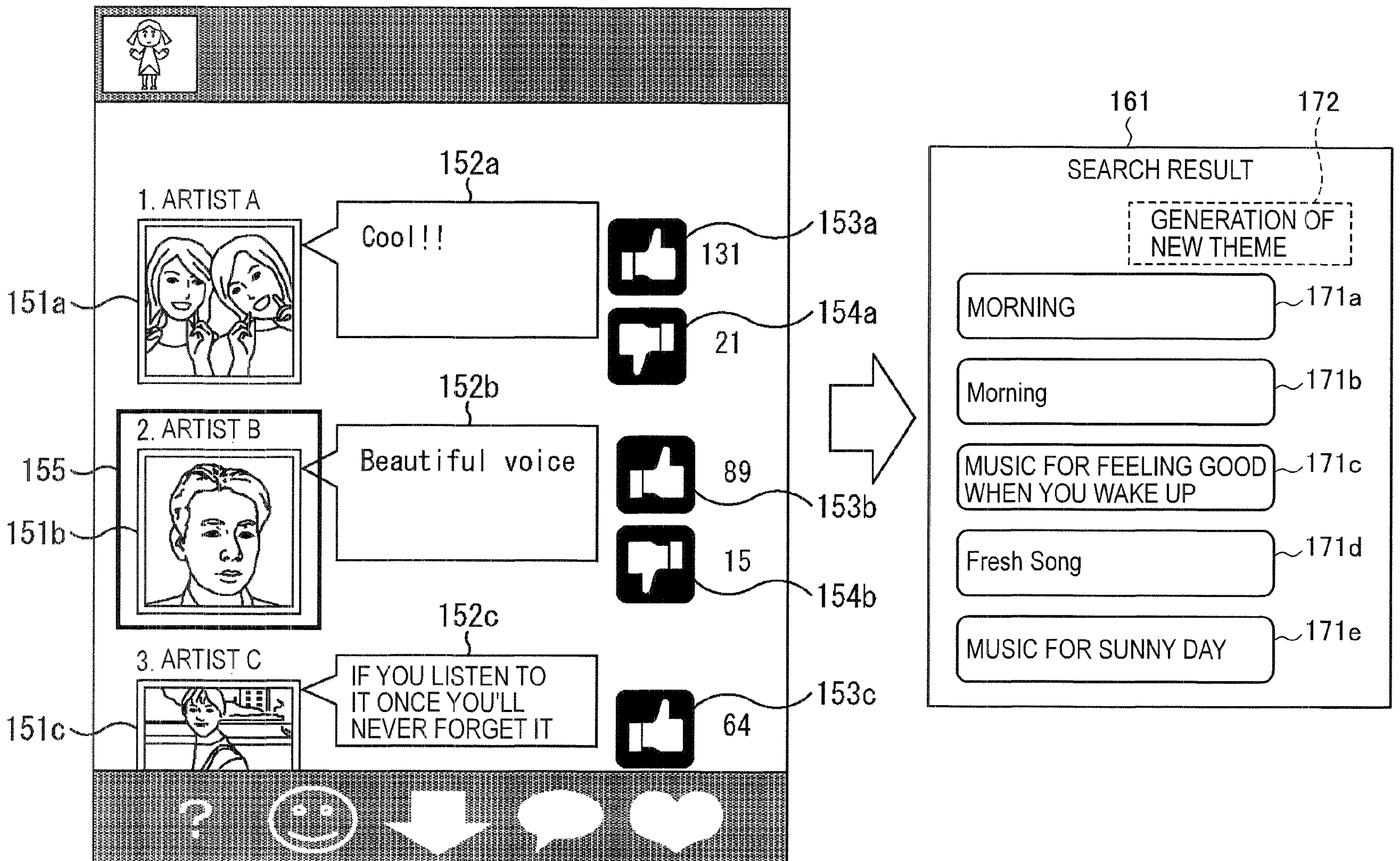
FIG. 11 is a diagram illustrating a second example of a playlist search screen.

A screen on the left side of FIG. 11 is an example of a screen used to designate content. On the screen, content information areas 151*a* to 151*e*, speech bubbles 152*a* to 152*c*, evaluation buttons 153*a* to 153*c*, evaluation buttons 154*a* and 154*b*, and a cursor 155 are displayed.

Information regarding pieces of content is displayed in the content information areas 151*a* to 151*c*. In this example, an image (for example, a jacket or the like of an album including content (musical composition)) indicating the content and an artist name are displayed.

Comments assigned by the users to the corresponding pieces of content are displayed in the speech bubbles 152*a* to 152*c*.

The evaluation buttons 153*a* to 153*c* and the evaluation buttons 154*a* and 154*b* are buttons that are used for the active user to assign the above-described single evaluation to the pieces of content. The evaluation buttons 153*a* to 153*c* are pressed down when positive evaluation is assigned. On the other hand, the evaluation buttons 154*a* and 154*b* are pressed down when negative evaluation is assigned.

The number of users assigning the positive evaluation to the pieces of content is displayed on each right side of the evaluation buttons 153*a* to 153*c*. Likewise, the number of users assigning the negative evaluation to the pieces of content is displayed on each right side of the evaluation buttons 154*a* and 154*b*. For example, in this example, 131 users assign the positive evaluation to the content of Artist A displayed in the content information area 151*a* and 21 users assign the negative evaluation to the content of Artist A.

The cursor 155 is used to select a desired content among the pieces of content displayed within the screen. The active user can select the desired content by vertically moving the cursor 155 using the input unit 76. Further, the content displayed within the screen can be switched by vertically scrolling the screen with the movement of the cursor 155.

The active user can designate the content selected by the cursor 155 using the input unit 76 as content to be used for the search. When the content is designated, the input unit 76 supplies information indicating the designated content to the playlist processing unit 73. Further, at this time, a plurality of pieces of content may be configured to be designated.

In step S122, the client 12 requests to search for the playlist. Specifically, when the active user confirms the designated content using the input unit 76 and gives an instruction to search for the playlist, the input unit 76 notifies the playlist processing unit 73 of the instruction to search for the playlist.

The playlist processing unit 73 generates a playlist search request signal which includes information (for example, identification information) indicating the designated content and is used to request search for the playlist, and transmits the generated playlist search request signal to the server 11 via the communication unit 71.

In step S123, the server 11 receives the request to search for the playlist. That is, the communication unit 31 of the server 11 receives the playlist search request signal from the client 12 via the network 13. The communication unit 31 supplies the received playlist search request signal to the content search unit 41.

In step S124, the content search unit 41 searches for content similar to the designated content. Here, an example of the method of searching for the similar content will be described.

For example, the similar content can be searched for based on a feature amount of each content. Specifically, the content search unit 41 calculates similarity of the feature amount between the designated content and each content other than the designated content based on the feature amount of each content stored in the content information storage unit 52 according to a predetermined method. At this time, any method can be adopted to calculate the similarity. Then, the content search unit 41 extracts the content with the similarity equal to or greater than a predetermined threshold value as the content similar to the designated content.

For example, the similar content can be searched for based on metadata of each content. Specifically, the content search unit 41 calculates similarity of metadata between the designated content and each content other than the designated content based on the metadata of each content stored in the content information storage unit 52 according to a predetermined method. At this time, any method can be adopted to calculate the similarity. Then, the content search unit 41 extracts the content with the similarity equal to or greater than a predetermined threshold value as the content similar to the designated content.

For example, the similar content can be searched for based on a comment assigned to each content. Specifically, the content search unit 41 searches for a comment similar to the content assigned to the designated content from the comments assigned to the pieces of content other than the designated content among the comments stored in the comment information storage unit 53. At this time, for example, the similar comment can be searched for using the same method as the method of searching for the similar theme in step S22 of FIG. 5. Then, the content search unit 41 extracts the content to which the similar comment is assigned as the content similar to the designated content.

The method of searching for the similar content is not limited to the above-described examples, but other methods can be adopted. For example, the similar content may be searched for using two or more of the feature amount, the metadata, and the comment of each content.

The content search unit 41 supplies information regarding the designated content and information regarding the similar content to the playlist search unit 42.

In step S125, the playlist search unit 42 searches for the playlist including the designated content and the similar content among the playlists stored in the playlist information storage unit 51.

At this time, the playlist including both the designated content and the similar content may be set as a search target, or the playlist including some of the designated content and the similar pieces of content may be set as the search target. In the latter case, for example, the playlist including a number equal to or greater than a predetermined number or a ratio equal to greater than a predetermined ratio of the designated content or the similar pieces of content may be set as the search target.

In step S126, the server 11 transmits the search result. Specifically, the playlist search unit 42 supplies the search result to the output control unit 46. The output control unit 46 generates a search result notification signal including the theme set in the playlist searched for in the process of step S125 and transmits the generated search result notification signal to the client 12 via the communication unit 31.

Figure 8:
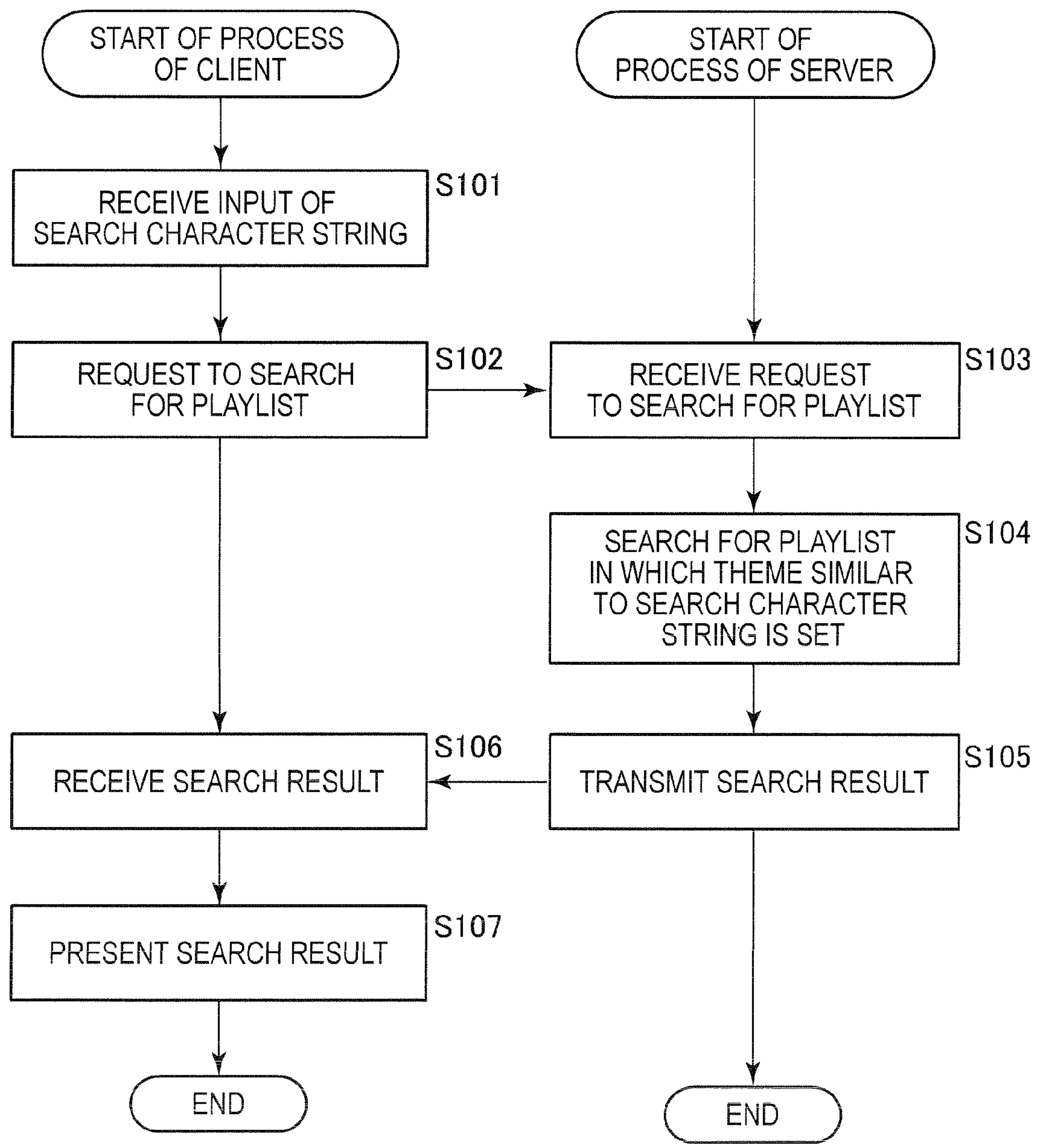
FIG. 8 is a flowchart illustrating a playlist search process according to a first embodiment.

Thereafter, in steps S127 and S128, the same processes as those of step S106 and S107 of FIG. 8 are performed.

Thus, for example, a window 161 on the right side is displayed within the screen on the left side of FIG. 11. The window 161 is the same as the window 111 of FIG. 9. Selection buttons 171*a* to 171*e* and a generation button 172 correspond to the selection buttons 121*a* to 121*e* and the generation button 122 of the window 111 of FIG. 9, respectively.

Thus, the active user can search for the playlist including the designated content or the content similar to the designated content by merely designating the content.

The playlist may be searched for using only the content designated by the active user without using the similar content.

(Third Playlist Search Process)

Figure 12:
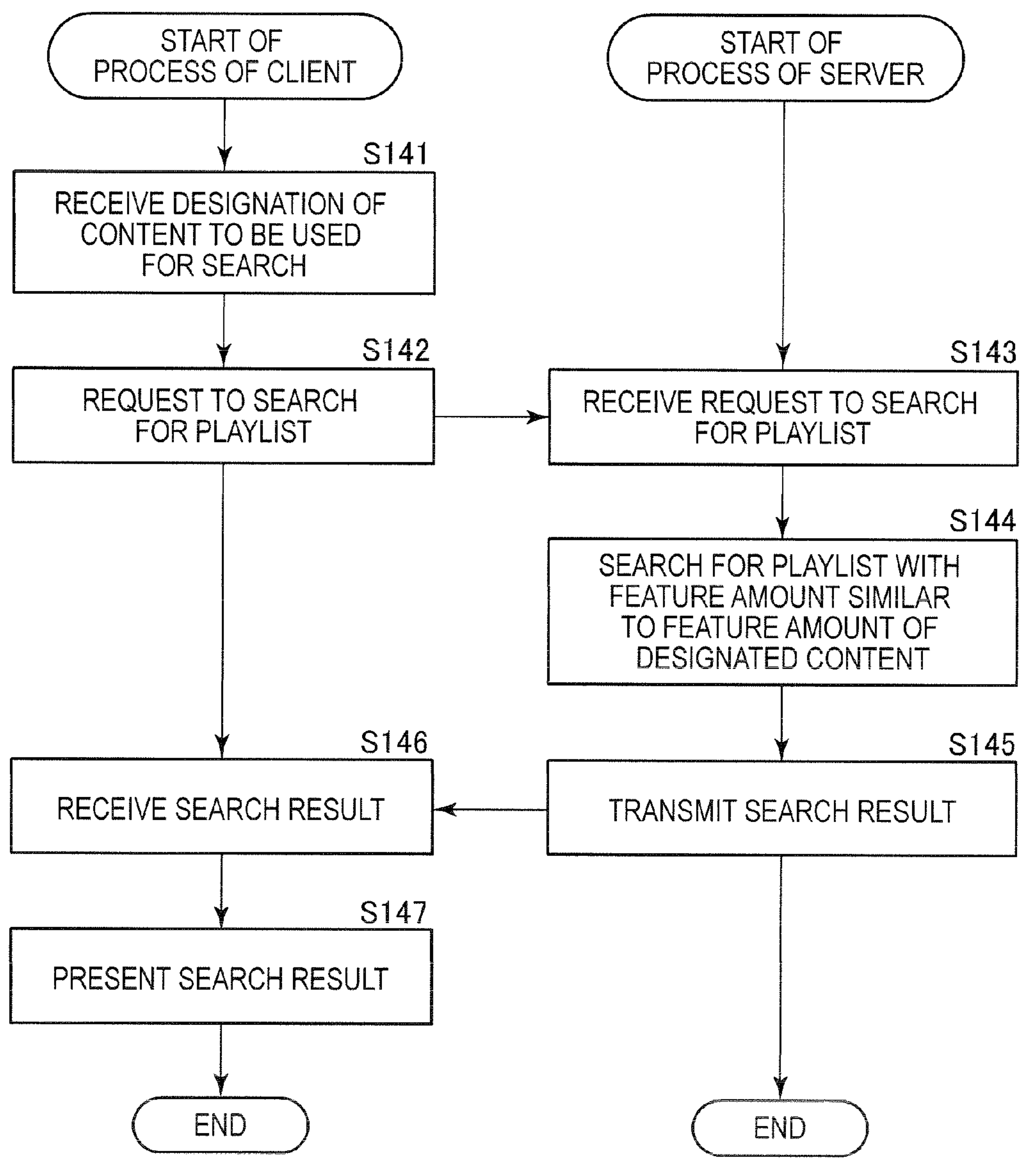
FIG. 12 is a flowchart illustrating a playlist search process according to a third embodiment.

Next, a playlist search process performed by the information processing system 1 according to a third embodiment will be described with reference to the flowchart of FIG. 12. In this embodiment, a playlist with a feature amount similar to the feature amount of the content designated by the active user is searched for.

Figure 10:
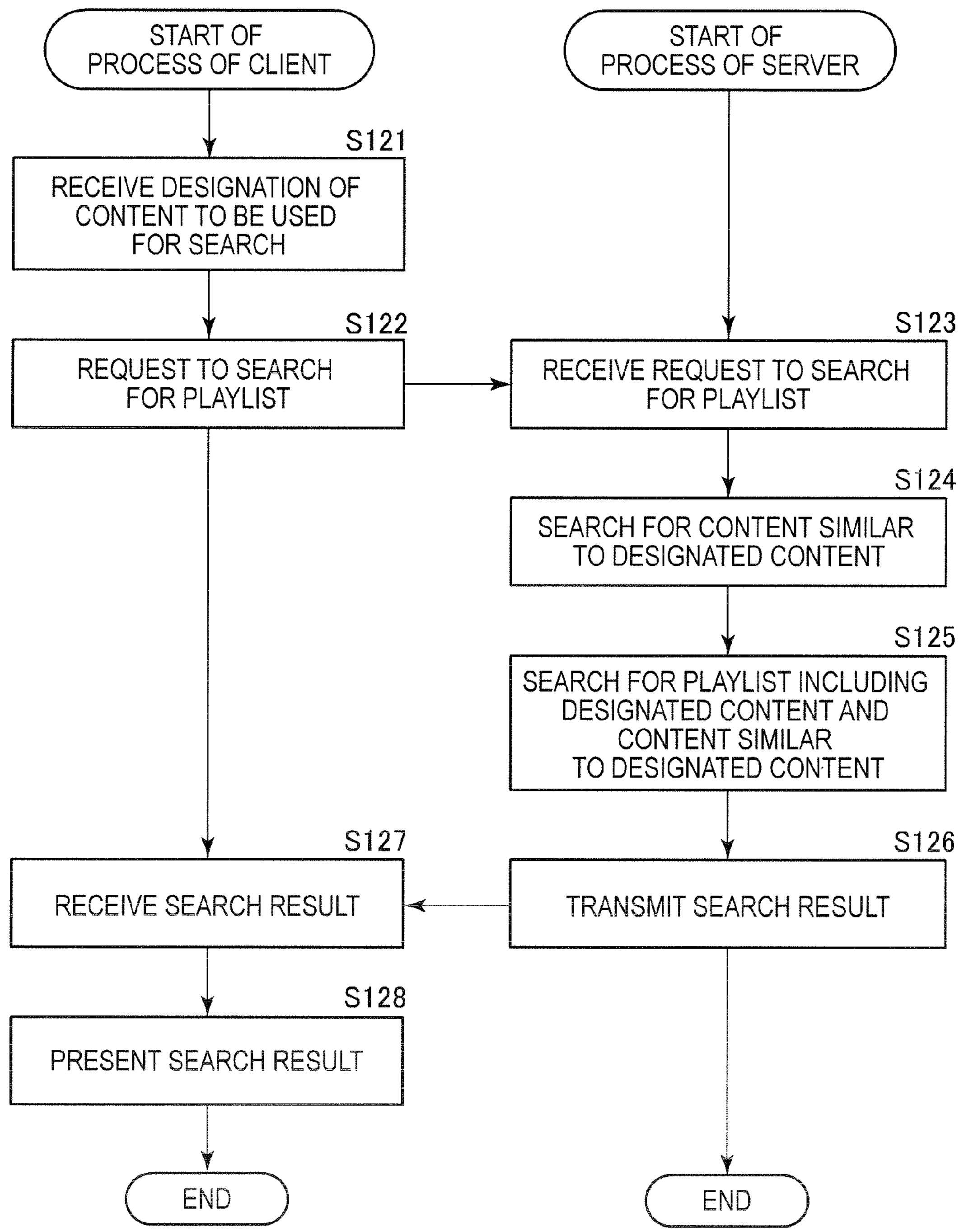
FIG. 10 is a flowchart illustrating a playlist search process according to a second embodiment.

In steps S141 and S142, the same processes as those of steps S121 and S122 of FIG. 10 are performed. Thus, content to be used for search is designated by the active user and a playlist search request signal including information indicating the designated content is transmitted from the client 12 to the server 11.

In step S143, the communication unit 31 of the server 11 receives the playlist search request signal from the client 12, as in the process of step S123 of FIG. 10. The communication unit 31 supplies the received playlist search request signal to the playlist search unit 42.

In step S144, the playlist search unit 42 searches for the playlist with a feature amount similar to the feature amount of the designated content. Specifically, the playlist search unit 42 calculates similarity between the feature amount of the designated content stored in the content information storage unit 52 and the feature amount of each playlist stored in the playlist information storage unit 51.

When a plurality of pieces of content are designated, for example, an average value of the feature amounts of the pieces of content is used. Any method can be adopted to calculate the similarity. Then, the playlist search unit 42 extracts the playlist for which the similarity is equal to or greater than a predetermined threshold value or the playlists with the similarity up to a predetermined rank from the top rank.

Thereafter, in steps S145 to S147, the same processes as those of steps S126 to S128 of FIG. 10 are performed.

Thus, the active user can search for the playlist with the feature amount similar to the feature amount of the designated content by merely designating the content.

(Playlist Presentation Process)

Figure 13:
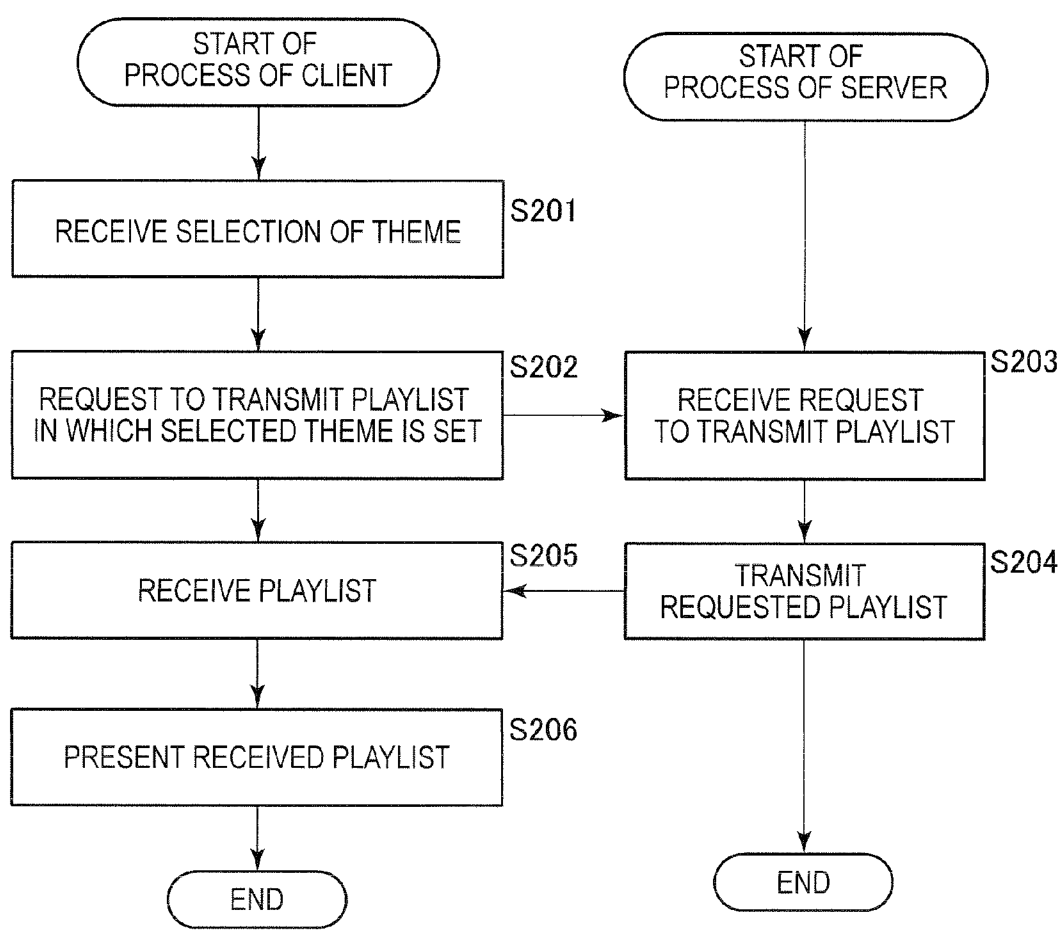
FIG. 13 is a flowchart illustrating a playlist presentation process.

Next, a playlist presentation process performed by the information processing system 1 will be described with reference to the flowchart of FIG. 13.

This process is performed, for example, after the search result of the playlist in the client 12 is presented.

In step S201, the client 12 receives selection of a theme. Specifically, for example, the active user selects a desired theme among themes of the playlists displayed within the window 111 of FIG. 9 or the window 161 of FIG. 11 using the input unit 76. The input unit 76 notifies the playlist processing unit 73 of the selected theme.

In step S202, the client 12 requests to transmit the playlist in which the selected theme is set. Specifically, the playlist processing unit 73 generates a playlist transmission request signal used to request to transmit the playlist in which the theme selected by the active user is set, and transmits the generated playlist transmission request signal to the server 11 via the communication unit 71.

In step S203, the server 11 receives the request to transmit the playlist. That is, the communication unit 31 of the server 11 receives the playlist transmission request signal from the client 12 via the network 13. The communication unit 31 supplies the received playlist transmission request signal to the output control unit 46.

In step S204, the server 11 transmits the requested playlist. Specifically, the output control unit 46 reads information regarding the playlist in which the theme selected by the active user is set from the playlist information storage unit 51, the content information storage unit 52, and the comment information storage unit 53. At this time, the read information includes, for example, the sequence of the pieces of content in the playlist, information (for example, identification information, a title, an artist name, or an image) regarding each content, a comment for each content, and a composite evaluation. The output control unit 46 generates a playlist transmission signal including the read information and transmits the generated playlist transmission signal to the client 12 via the communication unit 31.

In step S205, the client 12 receives the playlist. That is, the communication unit 71 of the client 12 receives the playlist transmission signal from the server 11 via the network 13. The communication unit 71 supplies the received playlist transmission signal to the playlist processing unit 73.

In step S206, the output control unit 74 causes the output unit 75 to present the received playlist under the control of the playlist processing unit 73.

Figure 14:
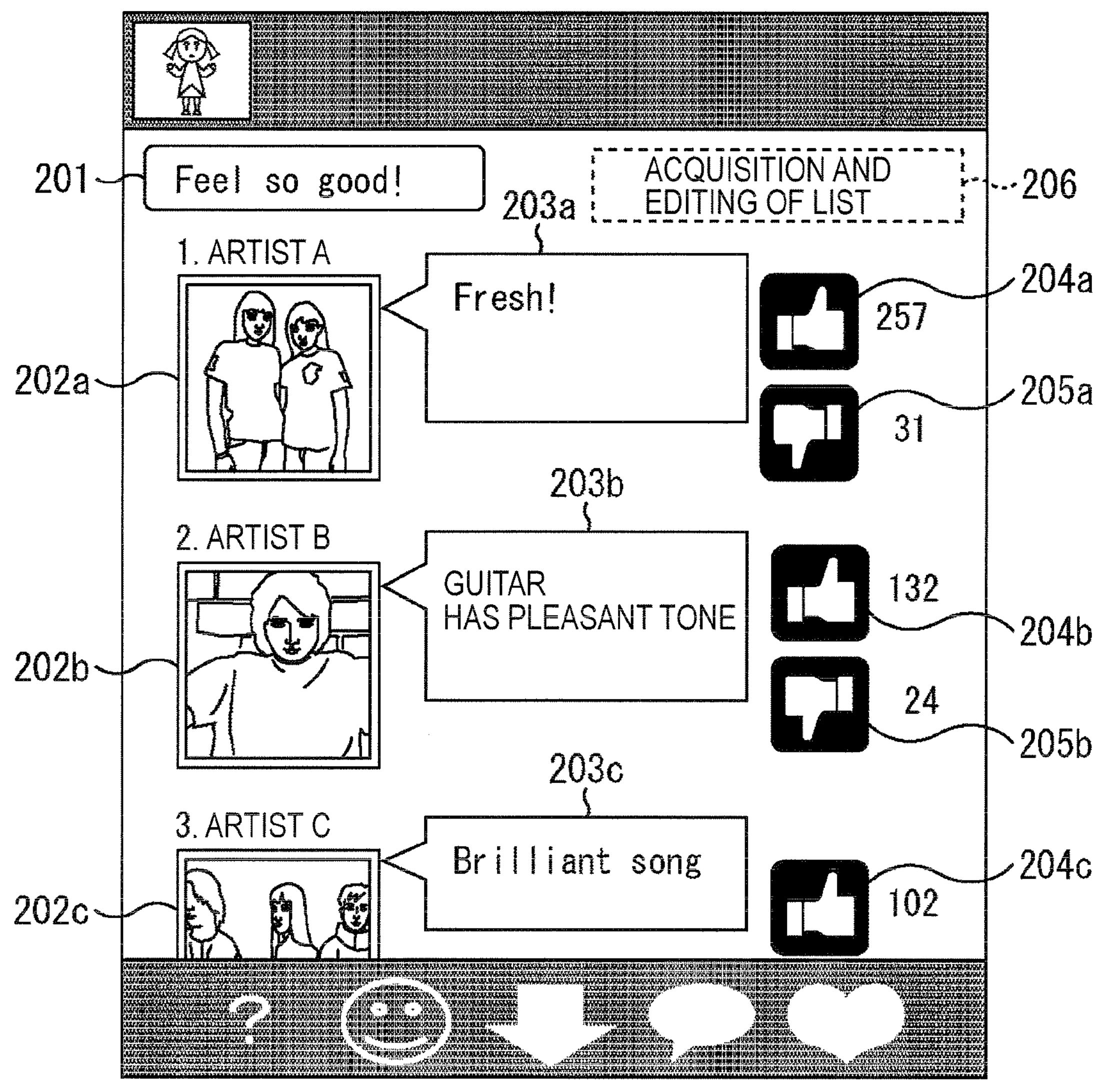
FIG. 14 is a diagram illustrating an example of a playlist presentation screen.

FIG. 14 is a diagram illustrating an example of a playlist presentation screen. On the playlist presentation screen, a theme box 201, content information areas 202*a* to 202*c*, speech bubbles 203*a* to 203*c*, evaluation buttons 204*a* to 204*c*, evaluation buttons 205*a* and 205*b*, and an edit button 206 are displayed.

In the theme box 201, a theme set in the presented playlist is displayed.

In the content information areas 202*a* to 202*c*, information regarding the content in the playlist is displayed in the sequence of the playlist. In this example, an image (for example, a jacket or the like of an album including content (musical composition)) indicating each content and an artist name are displayed.

In the speech bubbles 203*a* to 203*c*, comments assigned to the corresponding pieces of content by each user are displayed.

The evaluation buttons 204*a* to 204*c* and the evaluation buttons 205*a* and 205*b* are buttons that are used for the active user to assign the above-described composite evaluation to each content of the playlist. The evaluation buttons 204*a* to 204*c* are pressed down when positive evaluation is assigned. On the other hand, the evaluation buttons 205*a* and 205*b* are pressed down when negative evaluation is assigned.

The number of users assigning the positive evaluation to the pieces of content is displayed on each right side of the evaluation buttons 204*a* to 204*c*. Likewise, the number of users assigning the negative evaluation to the corresponding pieces of content is displayed on the right side of each of the evaluation buttons 205*a* and 205*b*. For example, in this example, 257 users assign the positive evaluation to the content of Artist A displayed in the content information area 202*a* and 31 users assign the negative evaluation to the content of Artist A.

The edit button 206 is pressed down when the presented playlist is downloaded from the server 11 to the client 12 and is edited in a local environment of the client 12.

The content displayed within the screen can be switched by vertically scrolling the screen using the input unit 76.

Thereafter, the playlist presentation process ends.

Thus, the active user can browse the details of the playlist in which the theme selected by the active user himself or herself is set. Thereafter, for example, the active user can participate in the cooperation edit of the playlist, or use the playlist, or acquire the playlist in the local environment.

(Content Addition Process)

Next, a content addition process performed by the information processing system 1 will be described with reference to the flowchart of FIG. 15.

This process starts, for example, when the active user inputs an instruction to add content to a playlist using the input unit 76 in a case in which the playlist (hereinafter referred to as a target playlist) in the client 12 is presented, as described above in FIG. 14, and the instruction is supplied from the input unit 76 to the playlist processing unit 73.

in step S301, the client 12 requests to transmit recommendation candidates for the content to be added to the playlist. Specifically, the playlist processing unit 73 generates a recommendation candidate request signal which includes information (for example, identification information) indicating the target playlist and is used to request to transmit the recommendation candidates for the target playlist, and transmits the recommendation candidate request signal to the server 11 via the communication unit 71.

In step S302, the server 11 receives the request to transmit the recommendation candidates. That is, the communication unit 31 of the server 11 receives the recommendation candidate request signal from the client 12 via the network 13. The communication unit 31 supplies the received recommendation candidate request signal to the content search unit 41.

In step S303, the content search unit 41 searches for the recommendation candidates. Here, an example of a method of searching for the recommendation candidates will be described.

For example, the recommendation candidates can be searched for based on the feature amount of each content. Specifically, the content search unit 41 reads the feature amount of the target playlist from the playlist information storage unit 51. Then, the content search unit 41 calculates similarity of the feature amount between the content not included in the target playlist and the content included in the target playlist among the pieces of content of which the feature amount is stored in the content information storage unit 52 according to a predetermined method. At this time, any method can be adopted to calculate the similarity. Then, the content search unit 41 extracts the content with the similarity equal to or greater than a predetermined threshold value as the recommendation candidate.

Thus, the content suitable for the feature of the target playlist is extracted as the recommendation candidate. On the other hand, the content not suitable for the feature of the target playlist is excluded from the recommendation candidate.

For example, the recommendation candidate can be searched for based on metadata of each content. Specifically, the content search unit 41 reads the metadata of the content of the target playlist from the content information storage unit 52. Then, the content search unit 41 calculates similarity of the metadata between the content not included in the target playlist and the content included in the target playlist among the pieces of content of which the metadata is stored in the content information storage unit 52 according to a predetermined method. At this time, any method can be adopted to calculate the similarity. Then, the content search unit 41 extracts the content with the similarity equal to or greater than a predetermined threshold value as the recommendation candidate.

Thus, the content with the attribute similar to the attribute of the content of the target playlist can be extracted as the recommendation candidate. On the other hand, the content with the attribute considerably different from the attribute of the content of the target playlist is excluded from the recommendation candidacy.

For example, the recommendation candidate can be searched for based on a comment assigned to each content. Specifically, for example, the content search unit 41 searches for a comment similar to the comment assigned to the content of the target playlist from the comments assigned to the pieces of content other than the pieces of content of the target playlist among the comments stored in the comment information storage unit 53. At this time, for example, the similar comment can be searched for using the same method as the method of searching for the similar theme in step S22 of FIG. 5. Then, the content search unit 41 extracts the content to which the similar comment is assigned as the recommendation candidate.

Thus, the content giving an impression, evaluation, or the like similar to that of the content of the target playlist to the user is extracted as the recommendation candidate. On the other hand, the content giving an impression, evaluation, or the like considerably different from the content of the target playlist to the user is excluded from the recommendation candidacy.

The method of searching for the recommendation candidate is not limited to the above-described example, but any method can be adopted. For example, the recommendation candidate may be searched for using two or more of the feature amount, the metadata, and the comment of each content.

The content search unit 41 supplies the search result of the recommendation candidate to the output control unit 46.

In step S304, the server 11 transmits the recommendation candidate. Specifically, the output control unit 46 reads information (for example, identification information, a title, and an artist name) regarding the recommendation candidate from the content information storage unit 52. Then, the output control unit 46 generates a recommendation candidate transmission signal including the information regarding the recommendation candidate and transmits the recommendation candidate transmission signal to the client 12 via the communication unit 31.

In step S305, the client 12 receives the recommendation candidates. That is, the communication unit 71 of the client 12 receives the recommendation candidate transmission signal via the network 13. The communication unit 71 supplies the recommendation candidate transmission signal to the playlist processing unit 73.

In step S306, the playlist processing unit 73 selects the recommendation candidate to be presented to the active user. For example, the playlist processing unit 73 selects the recommendation candidate to be presented to the active user by extracting the existing content already known by the active user from the recommendation candidates extracted by the server 11 based on the behavior history of the active user stored in the history storage unit 78.

Here, the content already known by the active user refers to, for example, content which the active user has previously used or evaluated or to which the active user has assigned a comment. Thus, an unknown content which the active user is unlikely to select is excluded from the recommendation candidates.

For example, the recommendation candidates may be narrowed down by extracting the content which the active user has frequently used or which the active user has highly evaluated. Thus, the recommendation candidates are narrowed down to the content which the active user is more likely to select.

For example, based on position information regarding the client 12, the recommendation candidates to be presented to the active user may be selected. For example, the recommendation candidates are considered to be narrowed down to, for example, the pieces of content produced in the nation or the region in which the client 12 is located or the pieces of content frequently used in the place in which the client 12 is located.

Further, for example, based on time information (for example, a season or a time), the recommendation candidates to be presented to the active user may be selected. For example, the recommendation candidates are considered to be narrowed down to the pieces of content relevant to the current season (for example, spring, summer, fall, or winter), the current time (for example, morning, day, or night), or the like. Here, the content relevant to the current season, time, or the like refers to, for example, content of which a title, lyrics, or the like is relevant to the current season or time or which is frequently used in the current season, time, or the like.

For example, based on a kind of the client 12, the recommendation candidates to be presented to the active user may be selected. For example, when the client 12 is a mobile phone, a smart phone, a portable information terminal, or the like, the recommendation candidates are considered to be narrowed down to pieces of content frequently used in a portable terminal.

Further, the recommendation candidates to be presented to the active user may be selected by combining the plurality of conditions or using other conditions.

Thus, the recommendation candidates extracted by the server 11 are further narrowed down according to the characteristics of the active user or the environment of the client 12.

In step S307, the output control unit 74 causes the output unit 75 to suggest the selected recommendation candidates under the control of the playlist processing unit 73.

In step S308, the client 12 receives an input of the content or the like to be added to the playlist. Specifically, the active user designates content to be added to the target play list using the input unit 76. At this time, the active user may designate the content to be added among the presented recommendation candidates or designate the content other than the recommendation pieces of content. Further, the active user can assign a comment or the like to the content to be added by operating the input unit 76. The input unit 76 supplies information indicating the content or the like designated by the active user to the playlist processing unit 73.

In step S309, the client 12 requests to add the content to the playlist. Specifically, the playlist processing unit 73 generates a content addition request signal which includes identification information regarding the content designated by the active user and a comment assigned to the content by the active user and is used to request to add the content to the target playlist. Then, the playlist processing unit 73 transmits the content addition request signal to the server 11 via the communication unit 71.

In step S310, the server 11 receives the request to add the content. That is, the communication unit 31 of the server 11 receives a playlist addition request signal from the client 12 via the network 13. The communication unit 31 supplies the received playlist addition request signal to the playlist editing unit 44.

In step S311, the playlist editing unit 44 adds the content to the playlist. For example, the playlist editing unit 44 adds the identification information regarding the content designated by the active user to the information regarding the target playlist stored in the playlist information storage unit 51 or stores the comment assigned by the active user in the comment information storage unit 53.

In step S312, the playlist editing unit 44 updates the metadata of the added content. Specifically, the playlist editing unit 44 assigns the metadata based on the theme set in the target playlist to the information regarding the content added to the target playlist stored in the content information storage unit 52. At this time, for example, the playlist editing unit 44 may assign all of the themes set in the target playlist as the metadata or may analyze the themes, extract characteristic words, and assign the extracted words as the metadata.

Thus, new metadata can be automatically assigned to the added content, and thus can be used in, for example, search of the content or a process of learning the preference of the user.

In step S313, the server 11 updates the feature amount of the playlist. Specifically, the playlist editing unit 44 notifies the feature amount analysis unit 45 of the update of the target playlist. The feature amount analysis unit 45 reads the feature amount of the content included in the target playlist from the content information storage unit 52. Then, the feature amount analysis unit 45 obtains the feature amount of the target playlist based on the feature amount of each content included in the target playlist. For example, the feature amount analysis unit 45 calculates an average value of the feature amounts of the content included in the target playlist as the feature amount of the playlist.

At this time, a weight may be assigned to the feature amount of each content based on the number of positive composite evaluations and the number of negative composite evaluations assigned to the pieces of content of the target playlist, and the weighted average of the features may be calculated as the feature amount of the target playlist. That is, the weighted average of the feature amounts may be calculated by setting a weight to be larger for the feature amount of the content with a higher composite evaluation and setting a weight to be smaller for the feature amount of the content with a lower composite evaluation. Here, the composite evaluation can be calculated so as to be high or low using, for example, a difference between the number of positive evaluations and the number of negative evaluations or a ratio of the number of positive evaluations to the number of negative evaluations as a reference.

Thereafter, the content addition process ends.

Thus, the plurality of users can edit the playlist cooperatively by each adding the content to the playlist. Further, by presenting the recommendation candidates, the content appropriate for the target playlist can be easily added by each user.

(Automatic Content Addition Process)

Figure 16:
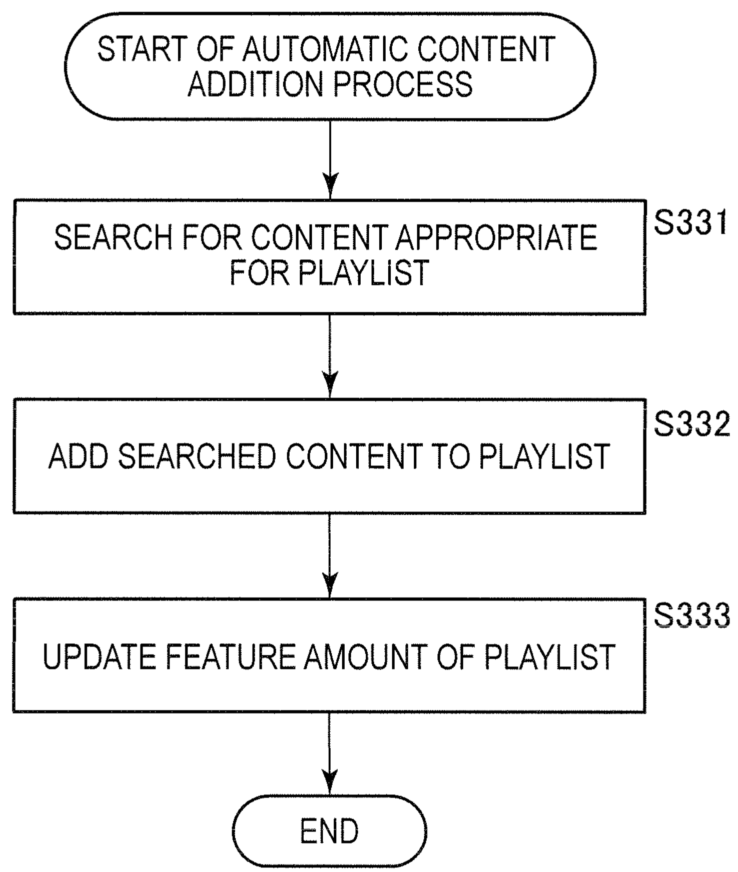
FIG. 16 is a flowchart illustrating an automatic content addition process.

Next, an automatic content addition process performed by the server 11 will be described with reference to the flowchart of FIG. 16.

This process is performed, for example, periodically or at a predetermined timing. Alternatively, for example, this process is performed when the playlist satisfies a predetermined condition, for example, when the number of pieces of content reaches a predetermined number or when a predetermined time elapses after the generation of the playlist. Alternatively, for example, this process is performed when the user gives an instruction to automatically add content.

In step S331, the content search unit 41 searches for the content appropriate for the playlist. Specifically, the content search unit 41 selects a playlist (hereinafter referred to as a target playlist) to which content is added among the playlists stored in the playlist information storage unit 51. At this time, when a condition for selection of the target playlist is set, the playlist satisfying this condition is selected.

Figure 15:
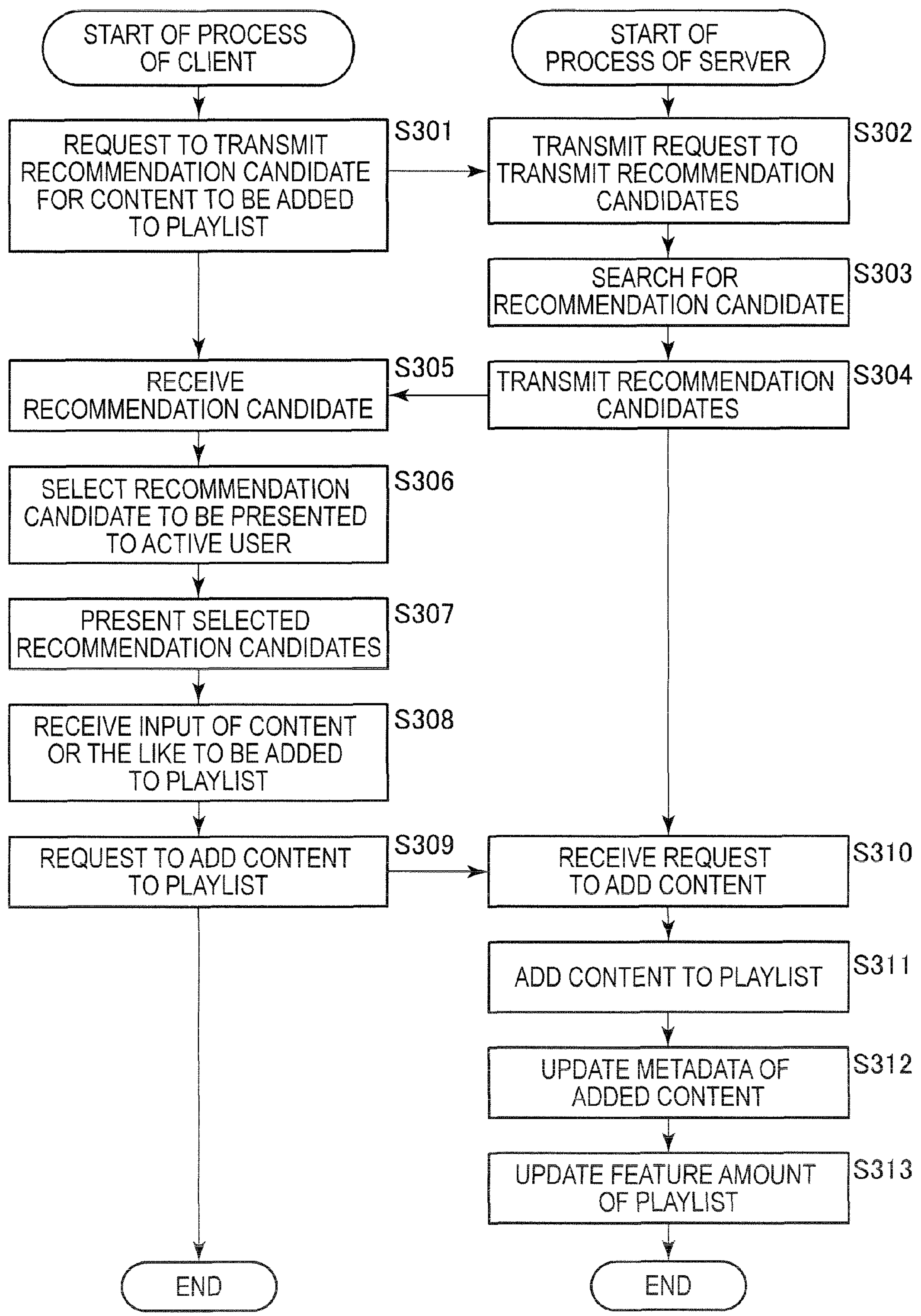
FIG. 15 is a flowchart illustrating a content addition process.

Next, for example, the content search unit 41 searches for the content appropriate for the target playlist according to the same method as the method of searching for the recommendation candidates in step S302 of FIG. 15. Then, the content search unit 41 supplies identification information regarding the target playlist and the search result to the playlist editing unit 44.

In step S332, the content searched for by the content search unit 41 is added to the target playlist, as in the process of step S312 of FIG. 15.

In step S333, the feature amount of the target playlist is updated, as in the process of step S313 of FIG. 15.

Thereafter, the automatic content addition process ends.

Thus, since the content appropriate for the playlist can be automatically added to the playlist, the details of the playlist can be enhanced.

(Process of Assigning Composite Evaluation to Content)

Figure 17:
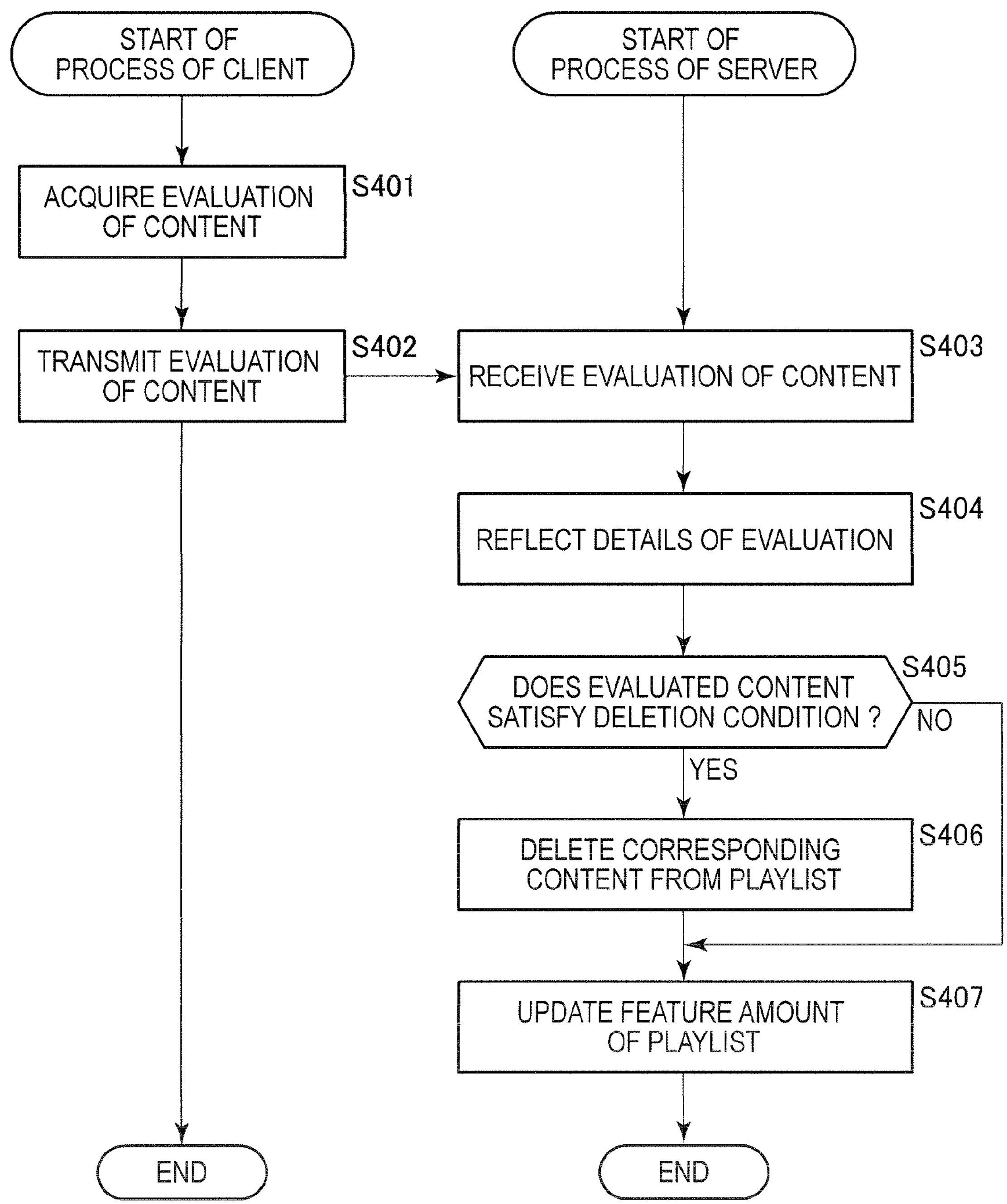
FIG. 17 is a flowchart illustrating a process of assigning a composite evaluation to content.

Next, a process of assigning a composite evaluation to content in the information processing system 1 will be described with reference to the flowchart of FIG. 17.

This process starts, for example, when the active user presses down any one of the evaluation buttons 204*a* to 205*b* using the input unit 76 in a case in which the playlist presentation screen in FIG. 14 is displayed in the client 12.

In step S401, the client 12 acquires evaluation of the content. Specifically, the input unit 76 notifies the playlist processing unit 73 of identification information regarding the evaluation button pressed down by the active user. The playlist processing unit 73 comprehends the evaluated content and evaluation details (positive or negative) based on the notified identification information.

At this time, the evaluation assigned to the content is the above-described composite evaluation. That is, the active user evaluates whether the content is appropriate for the playlist in addition to the evaluation of the single content.

In step S402, the client 12 transmits the evaluation of the content. Specifically, the playlist processing unit 73 generates an evaluation information transmission signal including identification information regarding the playlist (hereinafter, referred to as a target playlist) including the evaluated content, identification information regarding the evaluated content, and the evaluation details and transmits the evaluation information transmission signal to the server 11 via the communication unit 71.

In step S403, the server 11 receives the evaluation of the content. That is, the communication unit 31 of the server 11 receives the evaluation information transmission signal from the client 12 via the network 13. The communication unit 31 supplies the received evaluation information transmission signal to the playlist editing unit 44.

In step S404, the playlist editing unit 44 reflects the evaluation details. Specifically, the playlist editing unit 44 updates the composite evaluation of the evaluated content in the information regarding the target playlist stored in the playlist information storage unit 51. That is, when the positive evaluation is assigned to the content, the number of positive composite evaluations increases. When the negative evaluation is assigned to the content, the number of negative composite evaluations increases.

In step S405, the playlist editing unit 44 determines whether the evaluated content satisfies a deletion condition. For example, when the composite evaluation of the evaluated content may be considered to be objectively low, the playlist editing unit 44 determines that the content satisfies the deletion condition, and then the process proceeds to step S406.

Here, the case in which the composite evaluation may be considered to be objectively low is assumed to be, for example, a case in which the number of negative composite evaluations reaches a predetermined number or a case in which the number of negative composite evaluations exceeds the number of positive composite evaluations and a difference between the number of negative composite evaluations and the number of positive composite evaluations reaches a predetermined number. At this time, for example, the content added by each user may be excluded from a deletion target and only the content automatically added through the process of FIG. 16 by the server 11 may be set as the deletion target.

In step S406, the playlist editing unit 44 deletes the content from the playlist. Specifically, the playlist editing unit 44 deletes information regarding the content from the information regarding the target playlist stored in the playlist information storage unit 51.

Thereafter, the process proceeds to step S407.

Conversely, when it is determined in step S405 that the evaluated content does not satisfy a deletion condition, step S406 is not performed and the process proceeds to step S407.

In step S407, the feature amount of the playlist is updated, as in the process of step S313 of FIG. 15.

Thereafter, the process of assigning the composite evaluation to the content ends.

Thus, the content with the low composite evaluation can be deleted from the playlist by assigning the composite evaluation to the content of the playlist.

(Playlist Local Editing Process)

Figure 18:
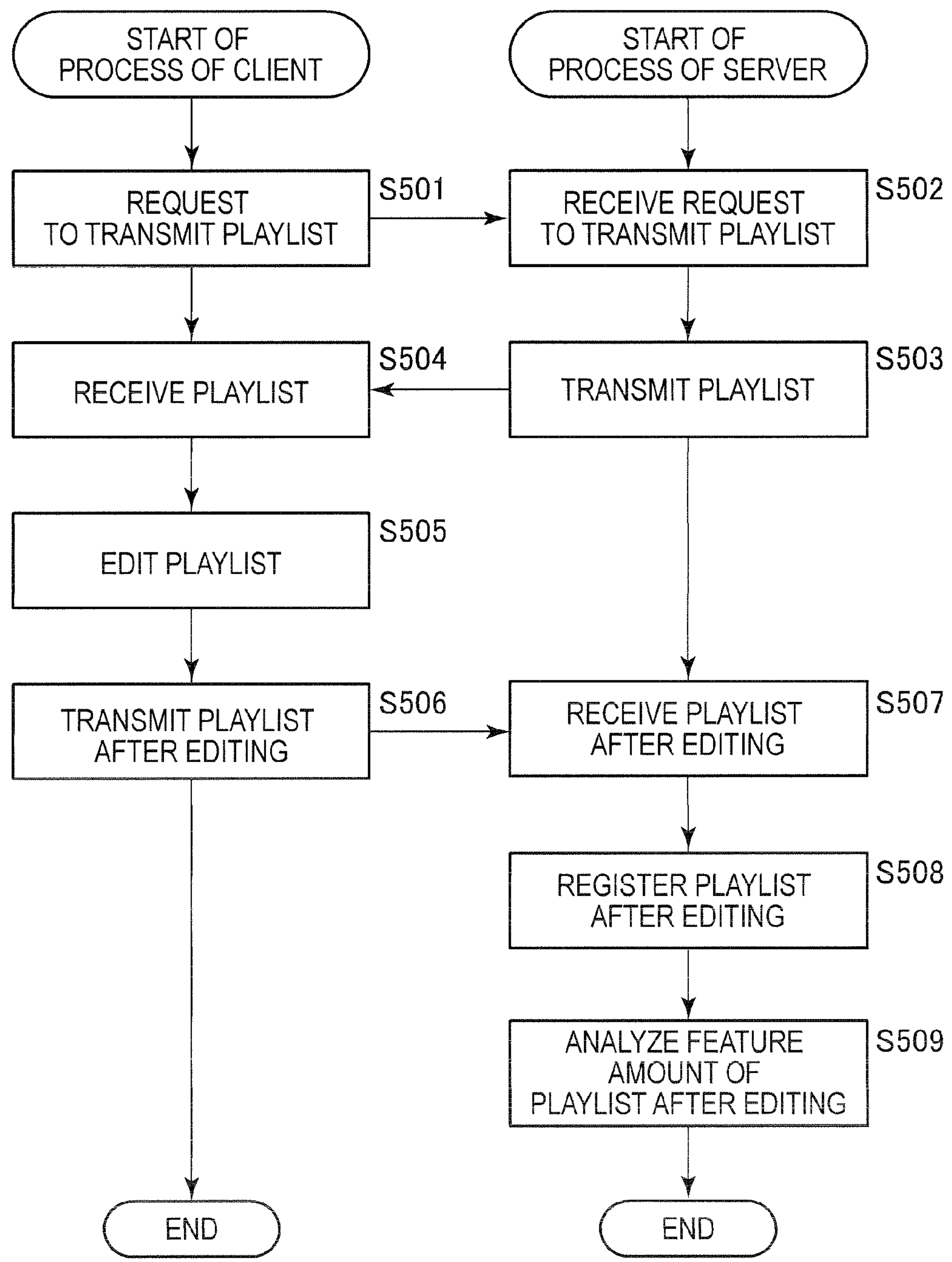
FIG. 18 is a flowchart illustrating a playlist local edit process.

Next, a playlist local editing process performed by the information processing system 1 will be described with reference to the flowchart of FIG. 18.

This process starts, for example, when the active user presses down the edit button 206 using the input unit 76 in a case in which a playlist (hereinafter referred to as a target playlist) is presented in the client 12, as described above in FIG. 14.

In step S501, the client 12 requests to transmit the playlist. Specifically, the playlist processing unit 73 generates a playlist transmission request signal which includes identification information regarding the target playlist and is used to request to transmit the target playlist, and transmits the playlist transmission request signal to the server 11 via the communication unit 71.

In step S502, the server 11 receives the request to transmit the playlist. That is, the communication unit 31 of the server 11 receives the playlist transmission request signal from the client 12 via the network 13. The communication unit 31 supplies the received playlist transmission request signal to the output control unit 46.

In step S503, the server 11 transmits the playlist. Specifically, the output control unit 46 reads information necessary for browsing or editing of the target playlist by the client 12 from the playlist information storage unit 51, the content information storage unit 52, and the comment information storage unit 53, and supplies the information to the output control unit 46. For example, information such as the theme of the playlist, the titles of the pieces of content of the playlist, artist names, the sequence of the pieces of content, and comments assigned to the pieces of content is read. The output control unit 46 generates a playlist transmission signal including the read information and transmits the playlist transmission signal to the client 12 via the communication unit 31.

In step S504, the client 12 receives the playlist. That is, the communication unit 71 of the client 12 receives the playlist transmission signal via the network 13. The communication unit 71 supplies the playlist transmission signal to the playlist processing unit 73.

In step S505, the client 12 edits the playlist. Specifically, the output control unit 74 causes the output unit 75 to display, for example, a playlist editing screen shown in FIG. 19 under the control of the playlist processing unit 73.

Figure 19:
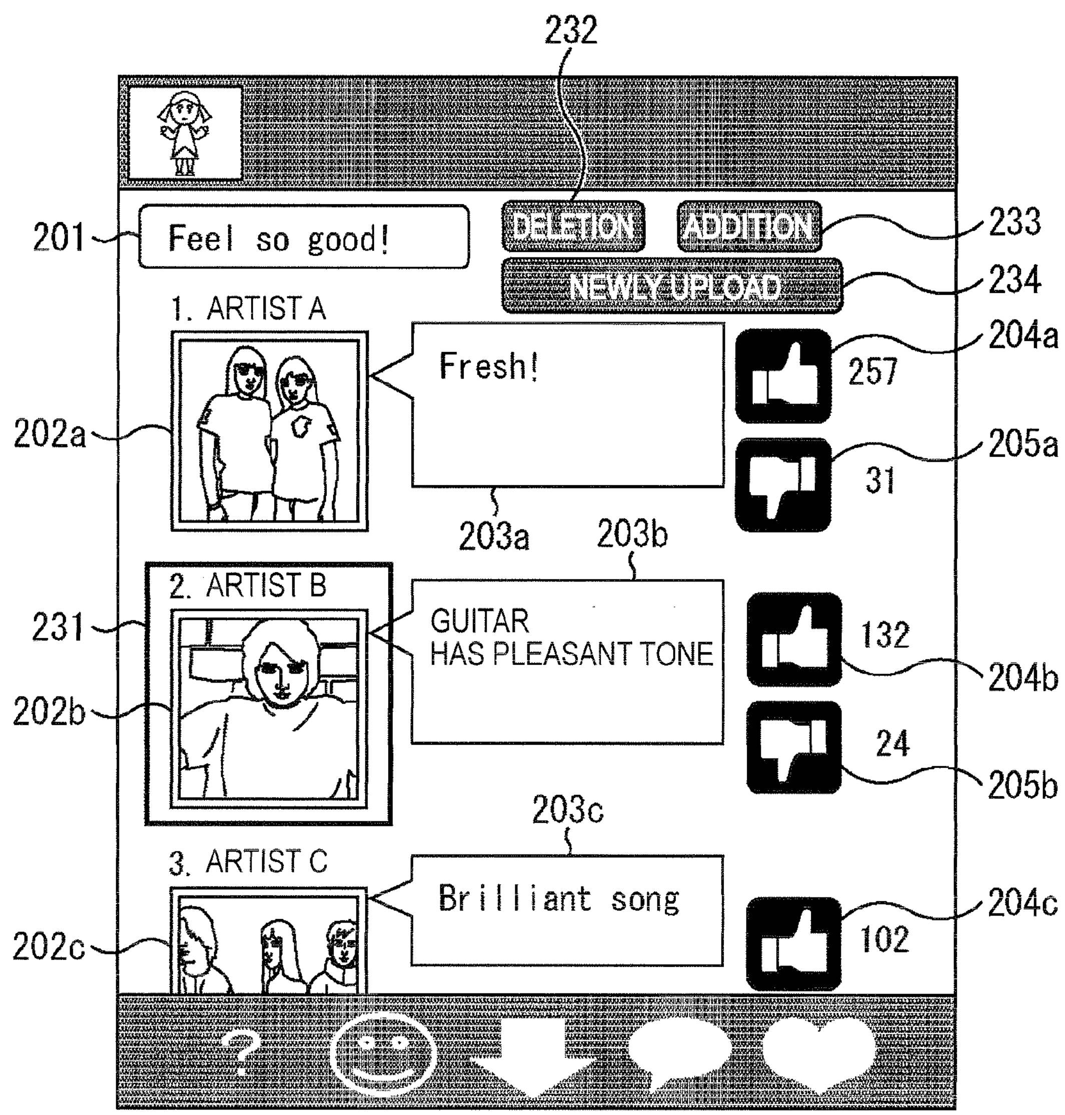
FIG. 19 is a flowchart illustrating an example of a playlist editing screen.

The playlist editing screen shown in FIG. 19 is different from the playlist presentation screen shown in FIG. 14 in that the edit button 206 is deleted and a cursor 231, a deletion button 232, an addition button 233, and an upload button 234 are added. The active user operates the cursor 231, the deletion button 232, the addition button 233, and the like using the input unit 76 to edit the target playlist.

Specifically, the cursor 231 is used to select a desired content among the pieces of content of the target playlist. That is, the active user can select the desired content by vertically moving the cursor 231 using the input unit 76. Further, the content displayed within the screen can be switched by vertically scrolling the screen with the movement of the cursor 231.

The deletion button 232 is pressed down when the content selected with the cursor 231 is deleted from the playlist.

The addition button 233 is pressed down when a new content is added before or after the content selected with the cursor 231. For example, when the addition button 233 is pressed down, a screen, a window, or the like used to designate content to be newly added is displayed.

Besides, for example, the active user can change the sequence or the theme of the pieces of content of the target playlist by performing a predetermined operation.

The upload button 234 is pressed down when the edit playlist is uploaded to the server 11. A process performed when the upload button 234 is pressed down will be described below.

The input unit 76 notifies the playlist processing unit 73 of the details of the operation performed by the active user. The playlist processing unit 73 performs editing of the target playlist such as addition of content, deletion of content, and change of the sequence of the pieces of content according to the details of the operation.

In step S506, the client 12 transmits the playlist after the editing. Specifically, when the active user presses down the upload button 234 using the input unit 76, the input unit 76 notifies the playlist processing unit 73 that the upload button 234 is pressed down. The playlist processing unit 73 generates a playlist transmission signal including information regarding the playlist after the editing. Then, the playlist processing unit 73 transmits the playlist transmission signal to the server 11 via the communication unit 71.

In step S507, the server 11 receives the playlist after the editing. That is, the communication unit 31 of the server 11 receives the playlist transmission signal from the client 12 via the network 13. The communication unit 31 supplies the received playlist transmission signal to the theme setting unit 43 and the playlist editing unit 44.

In step S508, the playlist editing unit 44 registers the playlist after the editing. Specifically, the playlist editing unit 44 stores information regarding the playlist after the editing received from the client 12 in the playlist information storage unit 51.

At this time, when the theme of the playlist before the editing overlaps the theme of the playlist after the editing, for example, the theme setting unit 43 changes the theme of the playlist after the editing so that the same theme of the playlist can be prevented from being registered in an overlapping manner. For example, when the theme of the playlist before the editing is "Feel so good!," the theme of the playlist after the edit is changed to "Feel so good!2," "Feel so good! by User Name," or the like.

Thereafter, the local environment is edited by the active user and the playlist uploaded to the server is publicized so that the users can share the playlist.

In step S509, the feature amount of the playlist after the editing is analyzed, as in the process of step S67 of FIG. 7.

Thereafter, the playlist local editing process ends.

The edited playlist may not necessarily be uploaded to the server 11, as described above, but the playlist after the editing may be also used only in the local environment of the client 12.

(Playlist Integration Process)

Figure 20:
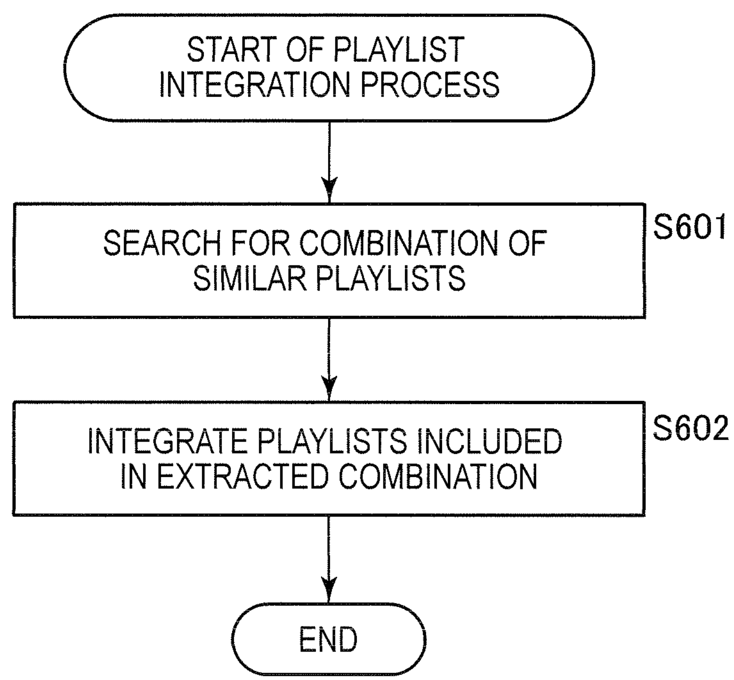
FIG. 20 is a flowchart illustrating a playlist integration process.

Next, a playlist integration process performed by the server 11 will be described with reference to the flowchart of FIG. 20.

This process is performed, for example, periodically or at a predetermined timing.

In step S601, the playlist search unit 42 searches for a combination of the similar playlists. For example, the playlist search unit 42 calculates similarity of a feature amount between the playlists stored in the playlist information storage unit 51. Then, the playlist search unit 42 extracts a combination of the playlists with the similarity of the feature amount equal to or greater than a predetermined threshold value.

Alternatively, for example, the playlist search unit 42 calculates the number of overlapping pieces of content of the playlists or an overlapping degree of the pieces of content of the playlists stored in the playlist information storage unit 51. Then, the playlist search unit 42 extracts the combination of the playlists with the number of overlapping pieces of content or the overlapping degree of the pieces of content equal to or greater than a predetermined threshold value.

Thus, the combination of two or more similar playlists is extracted. To lighten a load of the process, for example, the number of playlists included in the extracted combination may be restricted to two. That is, only a pair of the similar playlists may be extracted.

The playlist search unit 42 notifies the playlist editing unit 44 of the extracted combination of the playlists.

In step S602, the playlist editing unit 44 integrates the playlists included in the extracted combination. Specifically, the playlist editing unit 44 reads information regarding each playlist included in the extracted combination from the playlist information storage unit 51.

Then, the playlist editing unit 44 newly generates a playlist in which the pieces of content and the themes of the plurality of playlists included in the extracted combination are integrated. The newly generated playlist includes pieces of content included in at least one of the playlists before the integration. Further, for example, a theme obtained by combining the themes of the respective playlists is set as the theme of the newly generated playlist. For example, when the playlist in which the theme of "Nice" is set and the playlist in which the theme of "Cool" is set are integrated, the theme of "Nice & Cool" is set.

The playlist editing unit 44 stores information regarding the newly generated playlist in the playlist information storage unit 51. At this time, the original playlists may remain without change or may be deleted.

Thereafter, the process of the server 11 ends.

Thus, the new playlist can be generated by integrating the similar playlists.

For example, when languages are different, it is difficult to understand whether the plurality of themes are similar to each other. Therefore, a case in which the similar themes are set in different languages and a plurality of the same playlist are generated is assumed. Therefore, these plurality of playlists can be integrated through this process. Incidentally, each user can know a similar expression or word between the different languages by the themes of the integrated plurality of playlists.

Thus, the users can generate the playlist cooperatively based on any theme set by the users or the theme automatically set by the server 11. Accordingly, since the playlist can be generated from a broader viewpoint compared to a case in which individuals generates the playlist, the preferences, senses of values, knowledge, and the like of many users are reflected, and thus it is possible to provide the playlist in which high generality suitable for the wider preferences of the users is ensured. Further, since the width of the pieces of content is wider compared to a case in which individuals generate the pieces of content, it is possible to widen the preference or knowledge of the pieces of content of each user.

Each user can easily search for the playlist suitable for his or her own preference by merely designating a search character string or content.

<2. Modification Examples>

Hereinafter, modification examples of the above-described embodiments of the present technology will be described.

[Modification Example 1: Modification Example of List Generation Target]

The playlist generated according to the embodiments of the present technology can include not only all of the pieces of content but also some of the pieces of content. For example, only a bridge portion of a given content may be designated and may be included in the playlist.

The embodiments of the present technology can be applied not only to the music or the moving image described above, but also to cases in which lists of various pieces of content are generated using text, audio, images, and the like of books, games, software, web sites, news, advertisements, and the like.

The embodiments of the present technology can be applied to cases in which lists of various items such as goods, users of social services, celebrities, and the like other than the pieces of content are generated. For example, by applying the embodiments of the present technology, a theme such as "items that make me think of spring" may be set and lists of goods suitable for the theme can be generated cooperatively. For example, by applying the embodiments of the present technology, a theme such as "people that remind me of the sea" may be set and lists of users or lists of celebrities suitable for the theme can be generated cooperatively.

[Modification Example 2: Other Modification Examples]

In the new theme setting process in FIG. 5, even when there is a playlist in which a theme similar to a new theme is set, a playlist in which the new theme is set may be generated unconditionally in a case in which the same theme as the new theme is not set.

Further, in the playlist generation process in FIG. 7, for example, the server 11 may generate candidates for the plurality of themes based on the pieces of content designated by the client 12 and a desired theme may be selected from the plurality of candidates in the client 12.

The comments for a single content and the comments for the content of a playlist may be divided and assigned. In this case, for example, when the theme of the playlist is automatically generated or the playlist is searched for, the comment for the pieces of content of the playlist may be used.

For example, the range of the users cooperatively generating the list of items may be set. In this case, the number of users may not be plural. For example, a use method in which one specific user is designated and a list is generated by the designated user may be used.

[Exemplary Configuration of Computer]

The series of processes described above may be performed by hardware or software. When the series of processes is performed by software, a program of the software is installed in a computer. Here, the computer includes a computer embedded in dedicated hardware and a computer such as a general-purpose personal computer capable of installing various programs and executing various functions.

Figure 21:
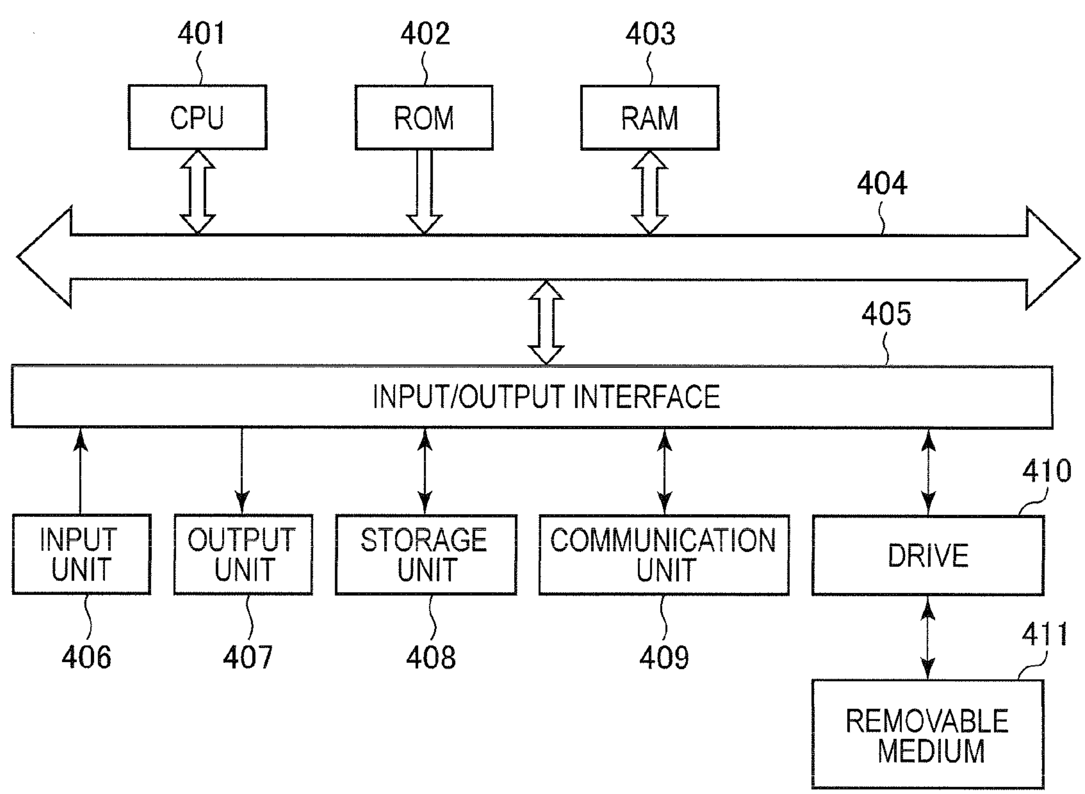
FIG. 21 is a block diagram illustrating an exemplary configuration of a computer.

FIG. 21 is a block diagram illustrating an exemplary hardware configuration of a computer executing the series of processes described above by executing a program.

In the computer, a central processing unit (CPU) 401, a read-only memory (ROM) 402, and a random access memory (RAM) 403 are connected to each other via a bus 404.

An input/output interface 405 is also connected to the bus 404. An input unit 406, an output control unit 407, a storage unit 408, a communication unit 409, and a drive 410 are connected to the input/output interface 405.

The input unit 406 includes a keyboard, a mouse, and a microphone. The output control unit 407 includes a display and a speaker. The storage unit 408 includes a hard disk and a non-volatile memory. The communication unit 409 includes a network interface. The drive 410 drives a removable medium 411 such as a magnetic disk, an optical disc, a magneto-optical disc, or a semiconductor memory.

In the computer having the above-described configuration, for example, the CPU 401 performs the series of processes described above by loading and executing the program stored in the storage unit 408 to the RAM 403 via the input/output interface 405 and the bus 404.

For example, the program executed by the computer (the CPU 401) can be recorded in the removable medium 411 as a packet medium and can be provided. Further, the program may be provided via a wired or wireless transmission medium such as a local area network, the Internet, or digital satellite broadcast.

In the computer, the program can be installed in the storage unit 408 via the input/output interface 405 by mounting the removable medium 411 on the drive 410. Further, the program can be received by the communication unit 409 and can be installed in the storage unit 408 via a wired or wireless transmission medium. Furthermore, the program can be installed in advance in the ROM 402 or the storage unit 408.

The program executed by the computer may be a program processed chronologically in the order described in this description or a program processed at a necessary timing in parallel or at a requested time.

In this description, the system means a set of a plurality of constituent elements (devices, modules (components), and the like) and all of the constituent elements may not be provided in the same casing. Accordingly, a plurality of devices accommodated in separate casings and connected to each other via a network and a single device in which a plurality of modules are accommodated in a single casing are both the system.

Embodiments of the present technology are not limited to the above-described embodiments, but may be modified in various ways within the scope of the present technology without departing from the gist of the present technology.

For example, the present technology may be realized by the configuration of cloud computing in which one function is distributed and shared in a plurality of devices via a network.

The steps described in the above-described flowcharts may be performed by a single device or may also be distributed and performed by a plurality of devices.

Further, when the plurality of processes are included in one step, the plurality of processes included in the one step can be performed by a single device or may also be distributed and performed by a plurality of devices.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:

a theme setting unit that sets a theme to generate an item list including one or more items;

an item list editing unit that adds an item designated for the theme by at least a user irrelevant to a setting of the theme to the item list in which the theme is set; and an output control unit that controls an output of the item list.

(2) The information processing device according to (1), further including:

an item list search unit that searches for the item list based on the item designated by the user, wherein the output control unit further controls an output of a search result of the item list.

(3) The information processing device according to (2), further including:

a feature amount analysis unit that calculates a feature amount of the item list based on a feature amount of an item included in the item list, wherein the item list search unit searches for the item list with a feature amount similar to a feature amount of the item designated by the user.

(4) The information processing device according to (3), wherein the feature amount analysis unit calculates the feature amount of the item list by weighting, based on evaluation assigned to the item included in the item list by the user, the feature amount of the item.

(5) The information processing device according to (2), further including:

an item search unit that searches for similar items with a feature amount similar to the feature amount of the item designated by the user, wherein the item list search unit searches for the item list including the item designated by the user and all or some of the similar items.

(6) The information processing device according to (1), further including:

an item list search unit that searches for the item list in which a theme similar to a character string designated by the user is set, wherein the output control unit controls output of a search result of the item list.

(7) The information processing device according to any one of (1) to (6), further including:

an item search unit that searches for a candidate for an item to be added to the item list, wherein the output control unit controls output of a search result of the candidate for the item.

(8) The information processing device according to (7), wherein the item search unit searches for an item with at least one of a feature amount, metadata, and an assigned comment similar to a feature amount, metadata, and an assigned comment of an item in the item list, respectively, as the candidate for the item to be added to the item list.

(9) The information processing device according to (7) or (8), wherein the item list editing unit adds the candidate for the item searched for by the item search unit to the item list.

(10) The information processing device according to any one of (1) to (9), wherein the theme setting unit sets a theme designated by the user.

(11) The information processing device according to any one of (1) to (10), wherein the theme setting unit sets the theme based on a comment assigned to the item designated by the user.

(12) The information processing device according to any one of (1) to (11), further including:

a feature amount analysis unit that calculates a feature amount of the item list based on a feature amount of an item included in the item list, wherein the item list editing unit integrates a plurality of the item lists with similar feature amounts.

(13) The information processing device according to any one of (1) to (12), wherein the item list editing unit assigns, to an item added to a playlist, metadata based on a theme set in the playlist.

(14) A program for causing a computer to perform the processes of:

setting a theme to generate an item list including one or more items;

adding an item designated for the theme by at least a user irrelevant to a setting of the theme to the item list in which the theme is set; and controlling an output of the item list.

(15) An information processing device including:

a communication unit that receives an item list to which an item is able to be added for a set theme by at least a user irrelevant to a setting of the set theme from another information processing device, and transmits information indicating the item to be added to the item list to the other information processing device;

a display control unit that controls display of the received item list; and an input unit that is used to designate the item to be added to the item list.

(16) The information processing device according to (15), further including:

a history management unit that manages an item use history of the user; and a selection unit that selects candidates for the item to be added to the item list, which are to be presented to the user, wherein the communication unit receives information indicating the candidates for the item to be added to the item list from the other information processing device, and wherein the selection unit selects the candidates for the item to be presented to the user among the received candidates for the item based on the item use history of the user.

(17) The information processing device according to (16), wherein the selection unit further selects the candidates for the item to be presented to the user among the received candidates for the item based on at least one of position information regarding the information processing device, a type of the information processing device, and time information.

(18) A recording medium having a program recorded thereon, the program causing a computer to perform the processes of:

receiving an item list to which an item is able to be added for a set theme by at least a user irrelevant to a setting of the theme from another information processing device;

controlling display of the received item list; and transmitting information indicating an item designated as the item to be added to the item list to the other information processing device.

The present disclosure contains subject matter related to that disclosed in Japanese Priority Patent Application JP 2012-079033 filed in the Japan Patent Office on Mar. 30, 2012, the entire content of which is hereby incorporated by reference.

What is claimed is:

1. An information processing device comprising:

a theme setting unit that sets a theme to generate an item list including one or more items;

an item list search unit that searches for a recommend list of items to be added to the theme based on a request for an item designated for the theme by at least a user irrelevant to a setting of the theme, wherein the recommended list of items includes items already known by the user based on behavior of the user;

an item list editing unit that adds a selected item, which is selected by the user from the recommended list of items designated for the theme, to the item list in which the theme is set;

a feature amount analysis unit that calculates a feature amount of the item list based on a feature amount of an item included in the item list;

wherein the item list search unit searches for the item list with a feature amount similar to a feature amount of the item designated by the user; and an output control unit that controls an output of the item list, wherein the feature amount analysis unit calculates the feature amount of the item list by weighting, based on evaluation assigned to the item included in the item list by the user, the feature amount of the item.

2. The information processing device according to claim 1, wherein the output control unit further controls an output of a search result of the item list.

3. The information processing device according to claim 2, further comprising:

the item list search unit that searches for similar items with a feature amount similar to the feature amount of the item designated by the user, wherein the item list search unit searches for the item list including the item designated by the user and all or some of the similar items.

4. The information processing device according to claim 1, further comprising:

the item list search unit that searches for the item list in which a theme similar to a character string designated by the user is set, wherein the output control unit controls output of a search result of the item list.

5. The information processing device according to claim 1, further comprising:

the item list search unit that searches for a candidate for an item to be added to the item list, wherein the output control unit controls output of a search result of the candidate for the item.

6. The information processing device according to claim 5, wherein the item search unit searches for an item with at least one of a feature amount, metadata, and an assigned comment similar to a feature amount, metadata, and an assigned comment of an item in the item list, respectively, as the candidate for the item to be added to the item list.

7. The information processing device according to claim 5, wherein the item list editing unit adds the candidate for the item searched for by the item search unit to the item list.

8. The information processing device according to claim 1, wherein the theme setting unit sets a theme designated by the user.

9. The information processing device according to claim 1, wherein the theme setting unit sets the theme based on a comment assigned to the item designated by the user.

10. The information processing device according to claim 1, further comprising:

a feature amount analysis unit that calculates a feature amount of the item list based on a feature amount of an item included in the item list, wherein the item list editing unit integrates a plurality of the item lists with similar feature amounts.

11. The information processing device according to claim 1, wherein the item list editing unit assigns, to an item added to a playlist, metadata based on a theme set in the playlist.

12. A program embodied in a non-transitory computer readable medium for causing a computer to perform the processes of:

setting a theme to generate an item list including one or more items;

searching for a list of recommended items to be added to the theme based on a request for an item designated for the theme by at least a user irrelevant to a setting of the theme, wherein the recommended list of items includes items already known by the user based on behavior of the user;

adding a selected item, which is selected by the user from the recommended items designated for the theme, to the item list in which the theme is set;

calculating a feature amount of the item list based on a feature amount of an item included in the item list, searching for the item list with a feature amount similar to a feature amount of the item designated by the user; and controlling an output of the item list, wherein the feature amount of the item list calculated is by weighting, based on evaluation assigned to the item included in the item list by the user, the feature amount of the item.

13. An information processing device comprising:

a communication hardware that (a) receives an item list of items, to which another item is able to be added for a set theme by at least a user irrelevant to a setting of the set theme, from another information processing device, (b) receives information indicating candidates for the other item to be added to the item list from the other information processing device based on a request from the user, wherein the candidates include candidates already known by the user based on behavior of the user, and (c) transmits information indicating the other item to be added to the item list to the other information processing device;

a history management unit that manages an item use history of the user; and a selection unit that selects candidates for the other item to be added to the item list, which are to be presented to the user; and wherein the selection unit selects the candidates for the other item to be presented to the user among the received candidates for the other item based on the item use history of the user;

wherein the selection unit further selects the candidates for the other item to be presented to the user among the received candidates for the other item based on at least one of position information regarding the information processing device, a type of the information processing device, and time information;

a display control unit that controls display of the received item list; and an input unit that is used by the user to designate one of the candidates for the other item to be added to the item list by the other information processing device.

14. A non-transitory recording medium having a program recorded thereon, the program causing a computer to perform the processes of:

receiving an item list of items, to which another item is able to be added for a set theme by at least a user irrelevant to a setting of the theme, from another information processing device;

receiving information indicating candidates for the other item to be added to the item list from the other information processing device based on a request from the user, wherein the candidates include candidates already known by the user based on behavior of the user;

managing an item use history of the user; and selecting candidates for the other item to be added to the item list, which are to be presented to the user; and wherein the selected candidates for the other item to be presented to the user among the received candidates for the other item is based on the item use history of the user:

wherein the candidates selected for the other item to be presented to the user among the received candidates for the other item is further based on at least one of position information regarding the information processing device, a type of the information processing device, and time information;

controlling display of the received item list; and transmitting information indicating one of the candidates as designated by the user as the other item to be added to the item list to the other information processing device.

* * * * *